United States Patent
Miyahara

(10) Patent No.: US 7,359,079 B2
(45) Date of Patent: Apr. 15, 2008

(54) PRINT SERVER, METHOD, AND SYSTEM CAPABLE OF HANDLING DIFFERENT KINDS OF DATA

(75) Inventor: Nobuaki Miyahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 436 days.

(21) Appl. No.: 11/200,029

(22) Filed: Aug. 10, 2005

(65) Prior Publication Data
US 2006/0001906 A1    Jan. 5, 2006

Related U.S. Application Data

(62) Division of application No. 09/612,435, filed on Jul. 7, 2000, now Pat. No. 6,956,665.

(30) Foreign Application Priority Data
Jul. 16, 1999  (JP)  .................. 11-203202

(51) Int. Cl.
*G06F 3/12* (2006.01)
*G06K 15/00* (2006.01)
(52) U.S. Cl. ..................... 358/1.15; 358/1.14
(58) Field of Classification Search ............... 358/1.1, 358/1.2, 1.4, 1.6, 1.12, 1.13, 1.14, 1.15, 403, 358/402
See application file for complete search history.

(56) References Cited

U.S. PATENT DOCUMENTS 6,104,496 A * 8/2000 Minowa et al. ............ 358/1.12
6,348,971 B2    2/2002 Owa et al. ................. 358/1.15

* cited by examiner

*Primary Examiner*—Douglas Q. Tran
(74) *Attorney, Agent, or Firm*—Fitzpatrick, Cella, Harper & Scinto

(57) ABSTRACT

In case of forming images by distributing image data mixedly including plural different kinds of data to plural image formation apparatuses, the data is distributed in consideration of a state of the image formation apparatus and data desired by a user is quickly output. In order to operate a system smoothly, an image formation system, which has an information processing apparatus capable of selectively transmitting a series of image data composed of plural pages containing first-kind image data and second-kind image data different from the first-kind image data to a first image formation apparatus and a second image formation apparatus in the page unit, controls to transmit the first-kind image data to the first image formation apparatus and transmit the second-kind image data to the second image formation apparatus from the series of image data. Further, transmission timing of the first-kind image data to the first image formation apparatus is made differ from transmission timing of the second-kind image data to the second image formation apparatus in accordance with a function of the first image formation apparatus or a function of the second image formation apparatus.

70 Claims, 16 Drawing Sheets

PRINT SERVER, METHOD, AND SYSTEM CAPABLE OF HANDLING DIFFERENT KINDS OF DATA

This application is a continuation application of application Ser. No. 09/612,435, now allowed, filed Jul. 7, 2000 now U.S. Pat. No. 6,956,665, which is incorporated herein by reference.

BACKGROUND OF THE INVENTION

1. Field of the Invention

The present invention relates to a print server, an image formation system, a control method thereof, and a storage medium, and more particularly to a print server capable of handling image data mixedly including plural different kinds of data, an image formation system containing this print server, a control method thereof, and a storage medium.

2. Related Background Art

In general, an image formation system which sends PDL (page description language) data, image data and the like generated by a host computer to an image formation apparatus connected to a print server through a network, expands the sent data into bit map, and outputs the bitmapped data is known. In the image formation apparatus of this image formation system, a printer and a BW (black-and-white) digital copying machine which have a function to perform high-speed print, a color printer and a color copying machine which perform color print, and the like are used. Further, in the image formation apparatus, a finisher which staples and punches output recording sheets and performs bookbinding processing to these sheets, a manual sheet feeder which feeds OHP (overhead projector) sheet and special sheets, and the like can be installed, whereby it is possible to easily perform bookbinding or the like of the recording sheets.

However, in recent years, image data which is generated by mixing BW data with color data is on the increase. Thus, in the current image formation system, even when a BW image output apparatus and a color image output apparatus are connected to the print server, the data mixedly including plural different kinds of data (e.g., BW data and color data) can be output by either one of the BW image output apparatus and the color image output apparatus. For this reason, there is a problem that, when the data is output by the BW image output apparatus, a color page is involuntarily reproduced as a BW page. Further, there is a problem that, when the data is output by the color image output apparatus, the data output takes much time because ordinary color processing is slow. Further, there is a problem that, since a BW image is handled as a color image, it costs to perform the image output.

Further, for example, when the image data mixedly including color and BW data is sent to the image formation apparatus, it is possible to distribute the BW data to the BW image formation apparatus and the color data to the color image formation apparatus so as to cause the BW image formation apparatus to print the BW data and the color image formation apparatus to print the color data. However, when the image data is sent to the image formation apparatus without considering a state of the image formation apparatus side, for example, there is some fear that the processing of the BW and/or color image formation apparatuses is monopolized until such the entire print ends and thus other users can not inconveniently use the BW and/or color image formation apparatus.

SUMMARY OF THE INVENTION

An object of the present invention is to provide a print server capable of solving the above problems, an image formation system containing this print server, a control method thereof, and a storage medium.

Another object of the present invention is to provide, in a case where a series of image data composed of plural pages is distributed to plural image formation apparatuses for each page and then image formation is performed by each image formation apparatus, a print server which can distribute the data in consideration of a state of the image formation apparatus side, quickly output the data desired by a user, and smoothly operate an entire system, an image formation system which contains this print server, a control method thereof, and a storage medium.

Other objects and features of the present invention will become apparent from the following detailed description and the attached drawings.

DETAILED DESCRIPTION OF THE PREFERRED EMBODIMENTS

Hereinafter, the embodiment of the present invention will be explained in detail with reference to the attached drawings.

Figure 1:
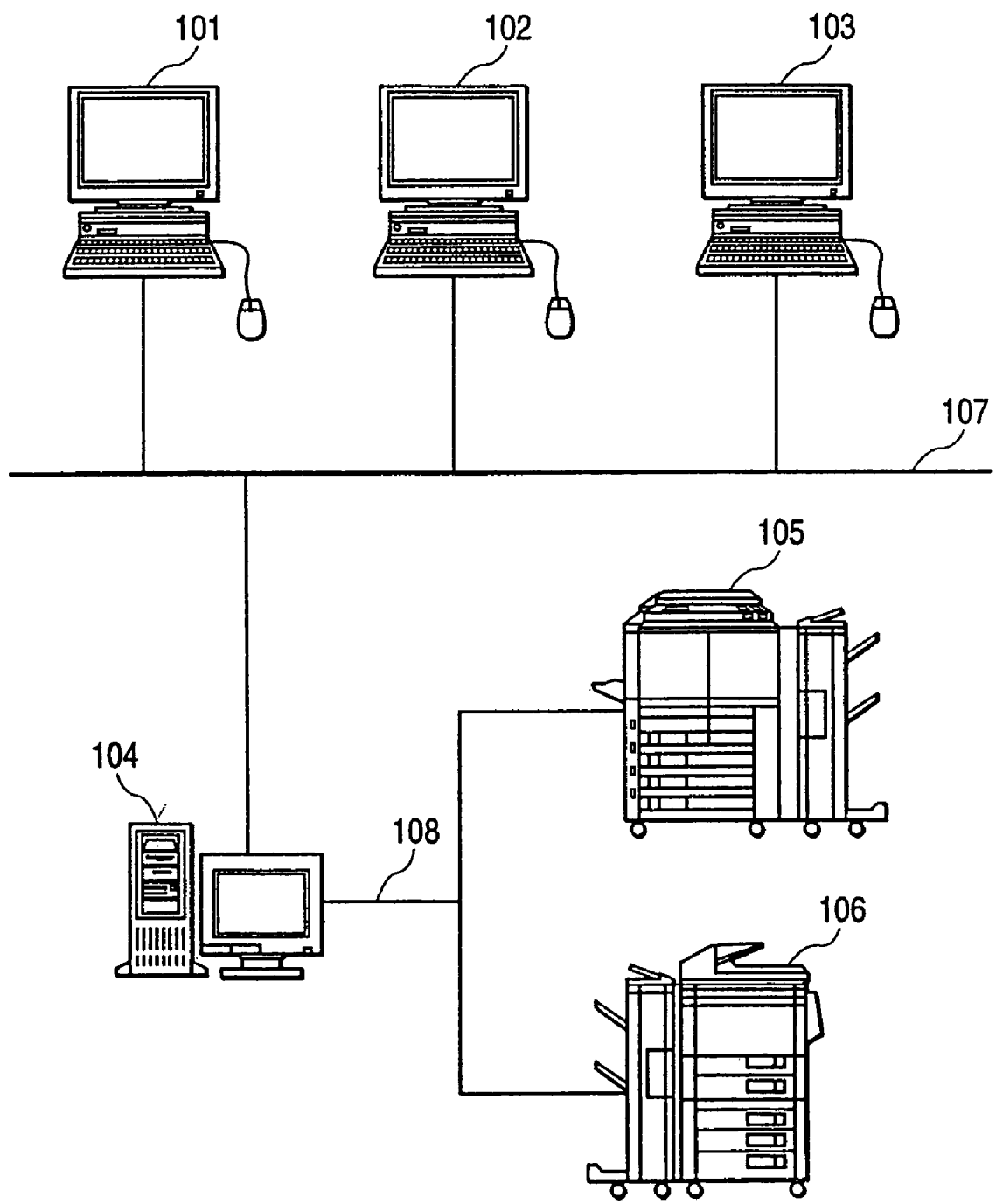
FIG. 1 is a diagram showing an entire structure of an image formation system (or an image print system) according to the embodiment of the present invention.

FIG. 1 is a structural diagram showing an image formation system (or an image print system) according to the embodiment of the present invention. In FIG. 1, host computers (external apparatuses) 101, 102 and 103 are information processing apparatuses which act as, e.g., image generation sources and are connected to a print server 104 through a network 107 such as an Ethernet or the like. The print server 104 is connected to image formation apparatuses, i.e., a color copying machine 105 and a BW (black-and-white) digital copying machine 106, through a parallel cable 108. The print server 104 which acts as the information processing apparatus to unitarily control the image formation system as a whole first receives image data transmitted from the host computers 101, 102 and 103. Then the print server 104 instructs the color copying machine 105 and the BW digital copying machine 106 to distribute the image data for each page and output the distributed image data.

The print server 104 can acquire information (including later-described various information) from the side of the image formation apparatus connected through a communication path such as the network 107, the parallel cable 108 or the like, from each image formation apparatus through the communication path. When the print server 104 acquires such the information, for example, it is possible to cause each image formation apparatus to output such the information in response to a request from the print server 104 side. Further, it is possible to cause the image formation apparatus to automatically notify the print server 104 of such the information in accordance with a state change of the image formation apparatus. Further, the print server 104 can not acquire such the information from the image formation device side. Namely, it is possible to previously register such the information in a memory of the print server 104.

In FIG. 1, one color copying machine 105 and one BW digital copying machine 106 are connected to the print server 104. However, plural other copying machines or plural printers can be connected to the print server 104. It should be noted that the host computers 101 to 103 have the identical structure. Therefore, the structure of only the host computer 101 will be explained, and thus explanation for the structure of the host computers 102 and 103 will be omitted.

Figure 2:
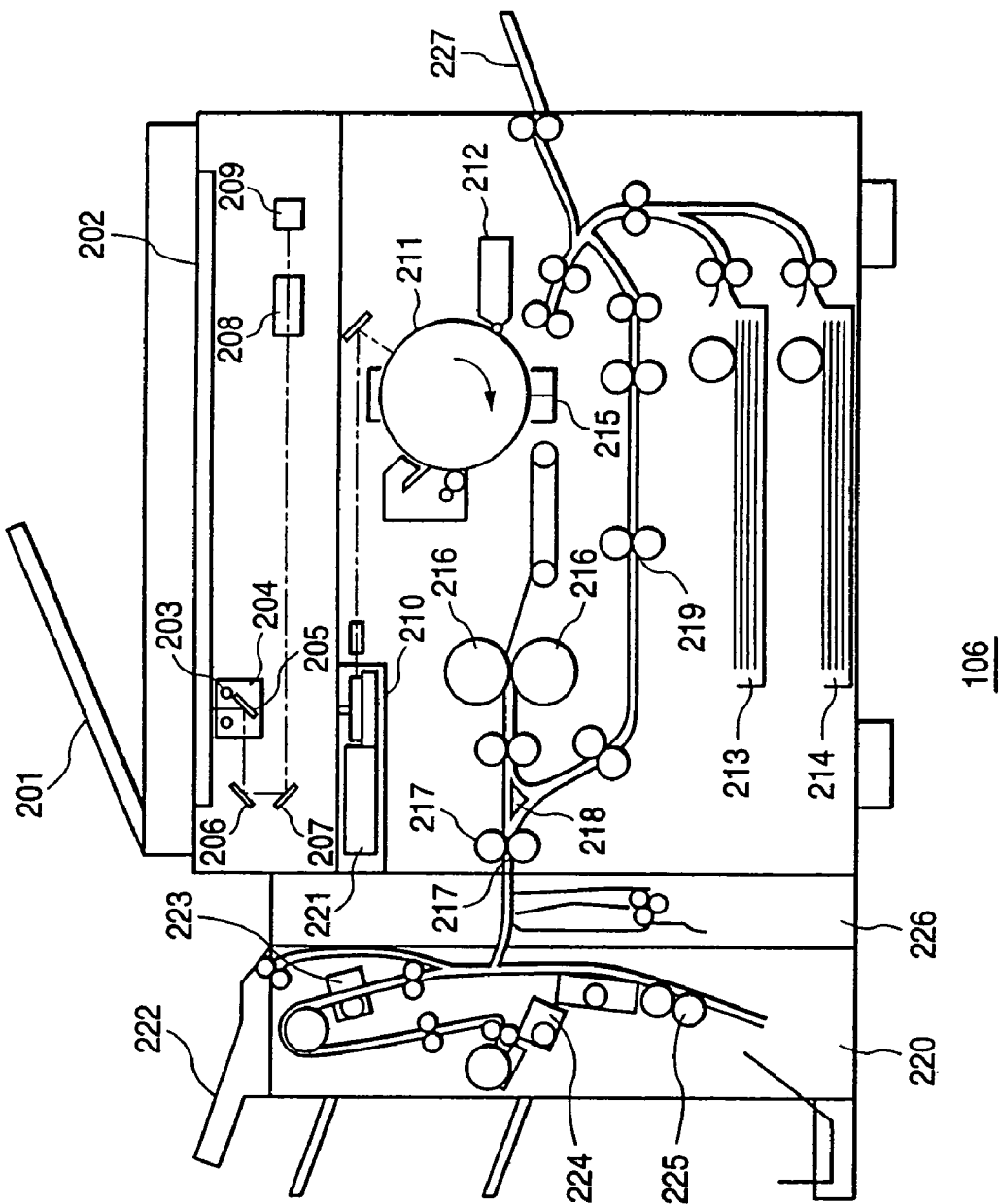
FIG. 2 is a schematic structural diagram showing a BW (black-and-white) digital copying machine 106 of FIG. 1.

FIG. 2 is a schematic structural diagram showing the BW digital copying machine 106 of FIG. 1. In FIG. 2, an original feeder 201 feeds originals to be copied, sequentially one by one from the head onto a platen glass 202. After an original reading operation ends, the original is discharged from the platen glass 202. When the original is on the platen glass 202, a lamp 203 is turned on, and movement of a scanner unit 204 is started, whereby the original is exposed and scanned. An image of the scanned original is read by a CCD image sensor 209 through mirrors 205, 206 and 207 and a lens 208.

A laser driver 221 drives a laser beam generation unit 210 to generate a laser beam according to output image data. The laser beam generated from the laser beam generation unit 210 is irradiated to a photosensitive drum 211, whereby a latent image corresponding to the laser beam is formed on the photosensitive drum 211. Developer is then adhered to the latent image portion by a development unit 212. It should be noted that, in the color copying machine 105, the development unit corresponding to four colors (yellow, magenta, cyan and black) is installed.

Next, a recording sheet is fed from any of cassettes 213 and 214 and a manual sheet feeder 227 at timing synchronous with a start of the laser beam irradiation, the fed recording sheet is carried to a transfer unit 215, and the developer adhered to the photosensitive drum 211 is transferred to the recording sheet. The recording sheet on which the developer was transferred is carried to a pair of fixing units (simply referred as a fixing unit hereinafter) 216, and the developer is fixed to the recording sheet by heat and pressure in the fixing unit 216. Ordinarily, the recording sheet which passed the fixing unit 216 is discharged outward by a pair of discharge rollers (simply referred as a discharge roller hereinafter) 217. However, when two-face recording is being set, the recording sheet is once carried up to the discharge roller 217, and a rotational direction of the discharge roller 217 is reversed, whereby the recording sheet is guided to a sheet refeed path 219 by a flapper 218. The recording sheet in the sheet refeed path 219 is again fed to the transfer unit 215, whereby the two-face recording is performed.

When a Z-folding unit 226 is being installed, the recording sheet is carried to the Z-folding unit 226, whereby the recording sheet can be folded into Z shape in response to an instruction from an operation unit. Further, when a finisher 220 is being installed, a recording sheet previously subjected to print is fed, the discharged recording sheets are stapled, and the discharged recording sheets are subjected to book binding. The finisher 220 is composed of an inserter 222, a puncher 223, a stapler 224, a saddle stitcher 225 and the like. Like the manual sheet feeder 227, the inserter 222 feeds the recording sheet previously subjected to the print, as a cover or an insert (a slipsheet). Thus, since it is possible to feed the recording sheet without passing feed paths such as the fixing unit 216 and the like, resultingly it is possible to feed the recording sheet without any damage. The puncher 223 punches holes in the recording sheets according to user's setting, and the stapler 224 staples the recording sheets. The saddle stitcher 225 stitches up the central portion of the recording sheet, whereby it is possible to easily perform bookbinding of the recording sheets.

Like the image formation apparatus according to the present embodiment, when various optional units such as the inserter 222, a later-described storage device and the like are being connected (or installed), the image formation apparatus notifies the print server 104 of information concerning these optional units through the communication paths such as the parallel cable 108 and the like, automatically or according to a request from the print server 104. (Another image formation apparatus similarly notifies the print server 104 of such information.) The print server 104 classifies the notified various information for each image formation apparatus and then stores and manages the classified information. Thus, the print server 104 can confirm what function, unit and the like each image formation apparatus has. In addition to the above structure that the information concerning the optional units is acquired from the image formation apparatus side, it is possible to have a structure that such the information is previously stored as management information in a memory of the print server 104 and then the management information (including function information, optional unit information and the like of the image formation apparatus) is appropriately read from the memory to confirm a state of the image formation apparatus side.

Figure 3:
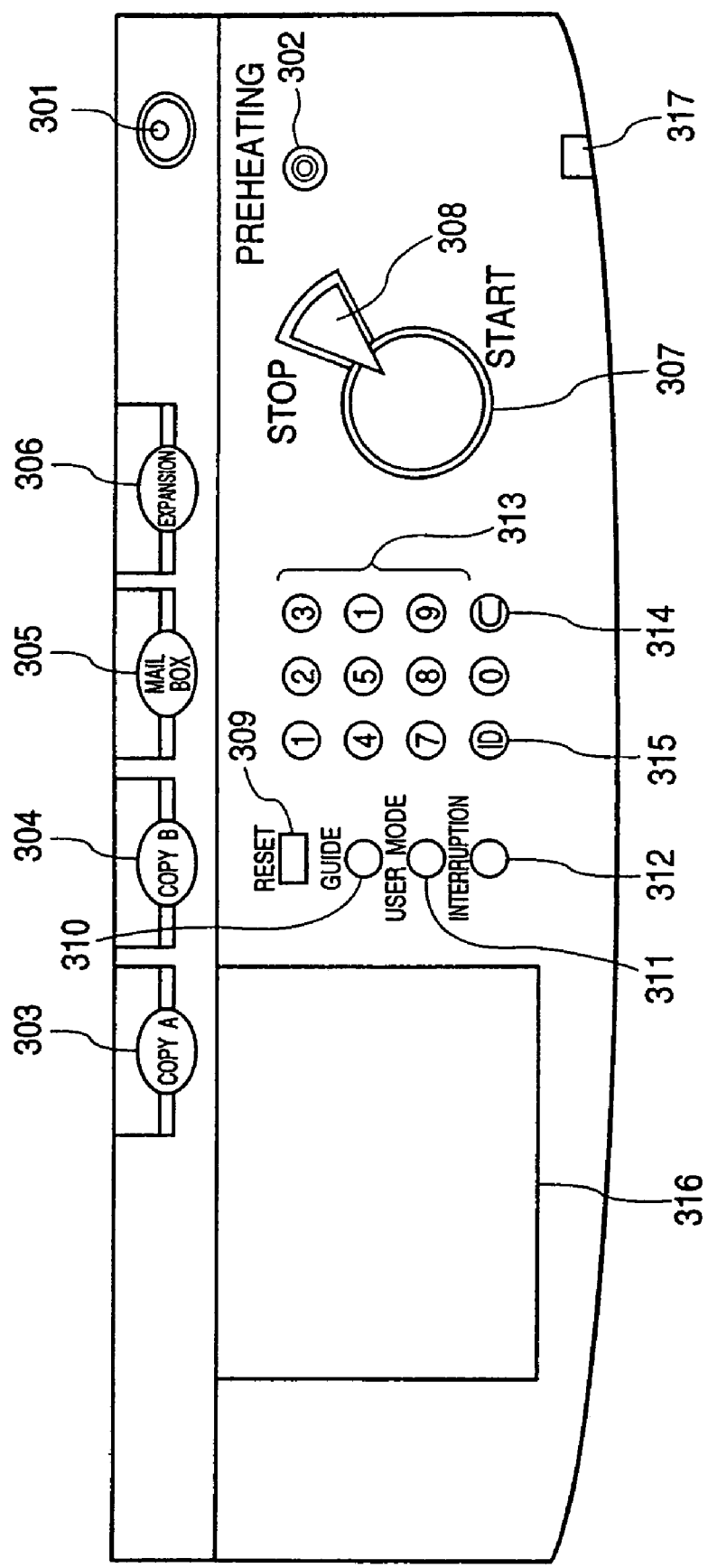
FIG. 3 is an appearance diagram showing key arrangement of an operation panel of a color copying machine 105 or the BW digital copying machine 106 of FIG. 1.

FIG. 3 is an appearance diagram showing key arrangement of an operation panel of the color copying machine 105 or the BW digital copying machine 106 shown in FIG. 1. A power supply switch 301 is used to control power supply to the body of the image formation apparatus. A preheating key 302 is used to set and release a preheating mode. A copy A mode key 303 and a copy B mode key 304 are used to select copy modes from among plural functions of the image output apparatuses. It should be noted that both a copy A mode and a copy B mode have the same copying function. Incidentally, the reason why such two kinds of copy mode keys are provided is that, when scanner reading in one copy mode has ended, a user can easily recognize to be able to perform data inputting in the other copy mode.

A mail box key 305 is used to select a mail box mode from among the plural functions. In the mail box mode, each user (individual or group) sets a storage area in the storage device such as the memory, a hard disk or the like of the image output apparatus, image data transmitted from the print server 104 or read by the scanner is thus stored in this storage area, and the stored image data is output according to a request. An expansion key 306 is used to, e.g., change the image data. Further, these keys 303 to 306 are used to call later-described respective function screens on an LCD (liquid crystal display) touch panel 316.

A copy start key 307 is used to instruct a start of copying, a stop key 308 is used to interrupt or stop the copying, a reset key 309 is used to restore an operation mode to a standard mode while the copying machine is on standby, a guide key 310 is used to confirm a function allocated to a key, and a user mode key 311 is used when the user changes fundamental setting of the system. An interruption key 312 is used to perform interruption copying, and a set of numeric keys 313 is used to input numerals.

A clear key 314 is used to clear the input numerals. In case of setting user limitation by ID (identification) input during use of the copying machine, an ID key 315 is used to change an input mode to an ID input mode. The LCD touch panel 316 which is composed of an LCD screen and a touch sensor displays a setting screen for each copy mode. Thus, by touching the displayed touch key, the user can performs various detailed setting. Also, the LCD touch panel 316 displays an image data processing state transmitted from the print server 104. A lamp 317 indicates a communication state of the network. Namely, the lamp 317 usually lights to green, blinks while communicating, and lights to red when a network error occurs.

Next, for example, in the image print system according to the present embodiment, it is assumed that data to instruct execution of a sort mode with three prints (copies) is input from the image generation source such as the host computer 101, 102, 103 or the like to the print server 104 through the communication network such as the network 107 or the like, together with a series of image data (PDL data) mixedly representing five-page BW and color images. An output procedure in this case will be explained with reference to FIGS. 4 and 5. It should be noted that, according to the structure of the print server 104, it is possible to sequentially input three sets of image data each set mixedly representing the five-page BW and color images.

Figure 4:
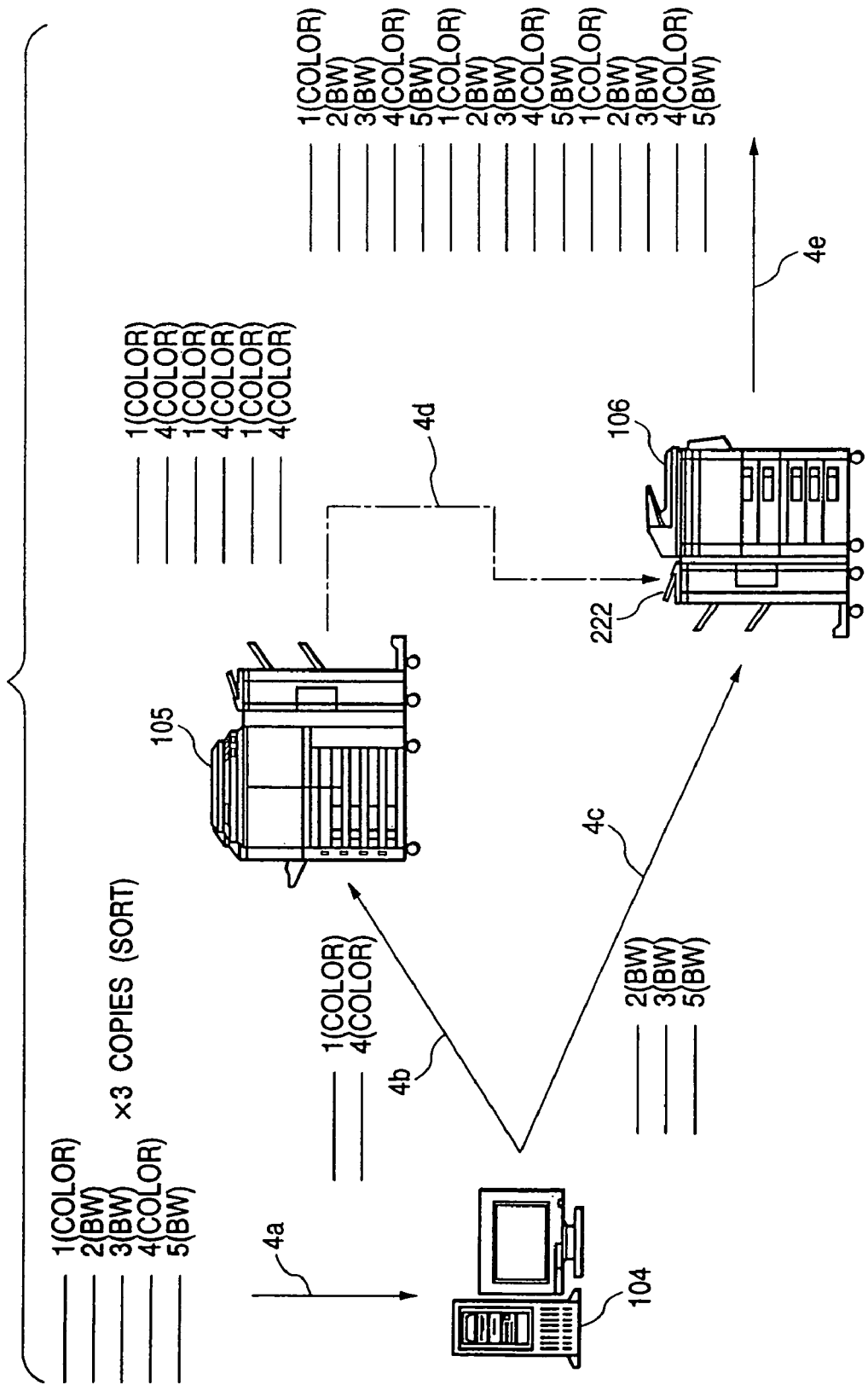
FIG. 4 is a diagram showing an output procedure based on the BW digital copying machine 106 in the image print system of FIG. 1.

FIG. 4 is a diagram showing the output procedure based on the BW digital copying machine 106 in the image print system of FIG. 1. In FIG. 4, the three sets of PDL data each set mixedly representing the five-page BW and color images (simply referred as data in the explanation of FIG. 4) are input to the print server 104 (processing 4*a*). Based on predetermined installation states of the connected color copying machine 105 and BW digital copying machine 106, the print server 104 judges which of BW base and color base the input data should depend on when this data is output.

When judged that the data should be output dependent on the BW base, the data representing color pages is first transmitted to the color copying machine 105, and the color copying machine 105 outputs the images of the color pages (processing 4*b*). At this time, when the color copying machine 105 is equipped with a storage device and has a data spooling function, the print server 104 only has to perform data transmission only once, whereby next processing can be performed without monopolizing the print server 104. In this case, the print server 104 transmits together with the image data the data to the color copying machine 105 through the communication path such as the parallel cable 108 or the like to instruct the color copying machine 105 to sort the three sets of output prints (copies). The color copying machine 105 which received these data performs electronic sort processing to produce plural prints (copies) by using the storage device or the like.

Conversely, when the color copying machine 105 is not equipped with the storage device and does not have the data spooling function, the print server 104 performs the data transmission several times (three times in this case). As above, the print server 104 controls even the number of data transmission times according as whether or not the image formation apparatus at a data transmission destination has the storage device (the spooling function).

Next, the user manually sets the color pages output by the color copying machine 105 to the inserter 222 or the manual sheet feeder 227 of the BW digital copying machine 106 as it is (processing 4*d*). The image data of the BW pages are transmitted to the BW digital copying machine 106 through the communication path such as the parallel cable 108 or the like. At this time, the information concerning the portions to which the color pages are to be inserted (page information representing the page to which the color page is to be inserted) is correlated with the image data and transmitted together with such the image data (processing 4*c*).

When the BW digital copying machine 106 does not have the data spooling function, the print server 104 generates an output trigger at optimum timing and transmits the data of the BW pages. For example, in this case, according as the user manually sets the output result of the color pages to the inserter 222 (or the manual sheet feeder 227), a detection result of the set sheets is notified to the print server 104. The print server 104 which received the detection result (or a user's instruction input from the operation unit of the BW digital copying machine 106, the host computer 101 or the like) transmits the data of the BW pages to the BW digital copying machine 106. In this case, since the three prints (copies) are output, the print server 104 transmits the data three times.

Conversely, when the BW digital copying machine 106 has the data spooling function, the print server 104 can transmit the data of the BW pages to the BW digital copying machine 106 before the user manually sets the output result of the color pages to the inserter 222 (or the manual sheet feeder 227) (processing 4*c*). Thus, it is possible by the spooling function to continue the processing without interrupting the output operation which is being performed by the BW digital copying machine 106. In this case, since the three prints (copies) are output, the print server 104 transmits together with the image data the data to the BW digital copying machine 106 to instruct it to sort the three sets of output prints (copies) (the data transmission is performed only once). The BW digital copying machine 106 which received these data performs electronic sort processing to produce plural prints (copies) by using the storage device or the like.

In the BW digital copying machine 106, the data stored in the storage device is output in response to the output trigger generated from the operation panel. Thus, on the basis of the information which was received from the print server 104 and concerns the pages to which the color pages are to be inserted, the BW pages are output as the color pages set in the inserter 222 or the manual sheet feeder 227 are appropriately inserted, whereby three sets of five-page output results each mixedly including the color and BW pages can be obtained (processing 4e).

Figure 5:
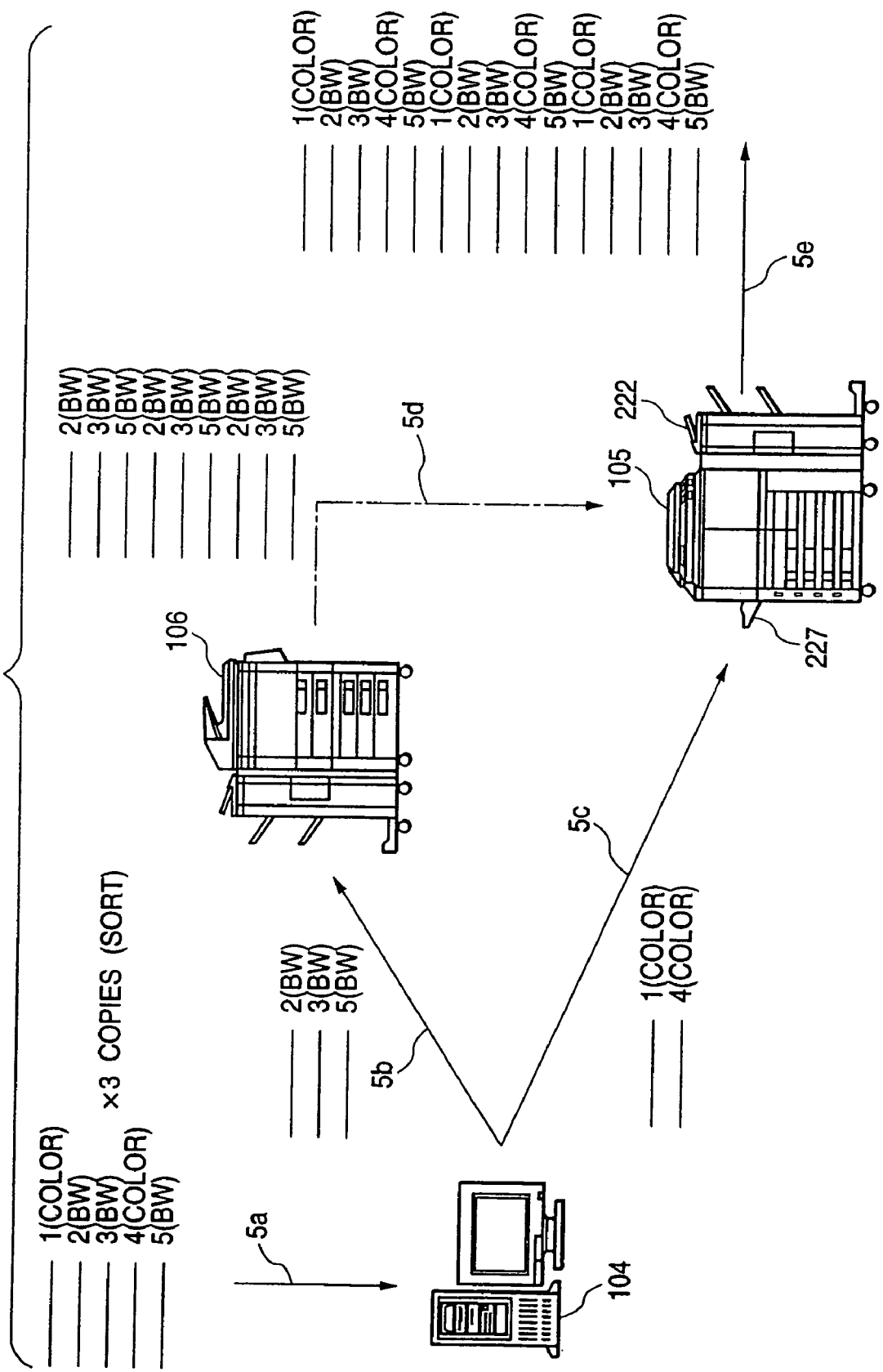
FIG. 5 is a diagram showing an output procedure based on the color copying machine 105 in the image print system of FIG. 1.

FIG. 5 is a diagram showing an output procedure based on the color copying machine 105 in the image print system of FIG. 1.

In FIG. 5, the three sets of PDL data each set mixedly representing the five-page BW and color images (simply referred as data in the explanation of FIG. 5) are input to the print server 104 (processing 5a). Based on installation states of the inserters and storage devices of the connected color copying machine 105 and BW digital copying machine 106, the print server 104 judges which of BW base and color base the input data should depend on when this data is output.

When judged that the data should be output dependent on the color base, the data representing BW pages is first transmitted to the BW digital copying machine 106 (processing 5b), and the BW digital copying machine 106 outputs the images of the BW pages. At this time, when the BW digital copying machine 106 is equipped with a storage device and has a data spooling function, the print server 104 only has to perform data transmission only once, whereby next processing can be performed without monopolizing the print server 104. In this case, as previously described, the print server 104 transmits together with the image data the data to the BW digital copying machine 106 to instruct it to sort the three sets of output prints (copies).

Next, the user manually sets the BW pages output by the BW digital copying machine 106 to the inserter 222 or the manual sheet feeder 227 of the color copying machine 105 as it is (processing 5d). The image data of the color pages are transmitted to the color copying machine 105 through the communication path such as the parallel cable 108 or the like. At this time, the information concerning the portions to which the BW pages are to be inserted (page information representing the page to which the BW page is to be inserted) is correlated with the image data and transmitted together with such the image data (processing 5c).

When the color copying machine 105 does not have the data spooling function, the print server 104 generates an output trigger at optimum timing and transmits the data of the color pages. For example, in this case, according as the user manually sets the output result of the BW pages to the inserter 222 (or the manual sheet feeder 227) of the color copying machine 105, a detection result of the set sheets is notified to the print server 104. The print server 104 which received the detection result (or a user's instruction input from the operation unit of the color copying machine 105, the host computer 101 or the like) transmits the data of the color pages to the color copying machine 105. In this case, since the three sets of prints (copies) are output, the print server 104 transmits the data three times.

Conversely, when the color copying machine 105 has the data spooling function, the print server 104 can transmit the data of the color pages to the color copying machine 105 before the user manually sets the output result of the BW pages to the color copying machine 105 (processing 5c). Thus, it is possible by the spooling function to continue the processing without interrupting the output operation which is being performed by the color copying machine 105. In this case, as previously described, since the three sets of prints (copies) are output, the print server 104 transmits together with the image data the data to the color copying machine 105 to instruct it to sort the three sets of output prints (copies).

In the color copying machine 105, the data stored in the storage device is output in response to the output trigger generated from the operation panel. Thus, on the basis of the information which was received from the print server 104 and concerns the pages to which the BW pages are to be inserted, the color pages are output as the BW pages set in the inserter 222 or the manual sheet feeder 227 are appropriately inserted, whereby three sets of five-page output results each mixedly including the color and BW pages can be obtained (processing 5e).

Next, an output processing procedure of the image print system according to the present embodiment will be explained with reference to FIGS. 6, 7, 8, 9, 10, 11 and 12. It should be noted that FIGS. 7 to 12 are flow charts showing respective individual output processing procedures described in a flow chart shown in FIG. 6. Since programs to perform various processing including the above processing have been stored in a not-shown memory of the print server 104, these programs are read and executed by a not-shown CPU of the print server 104.

Figure 6:
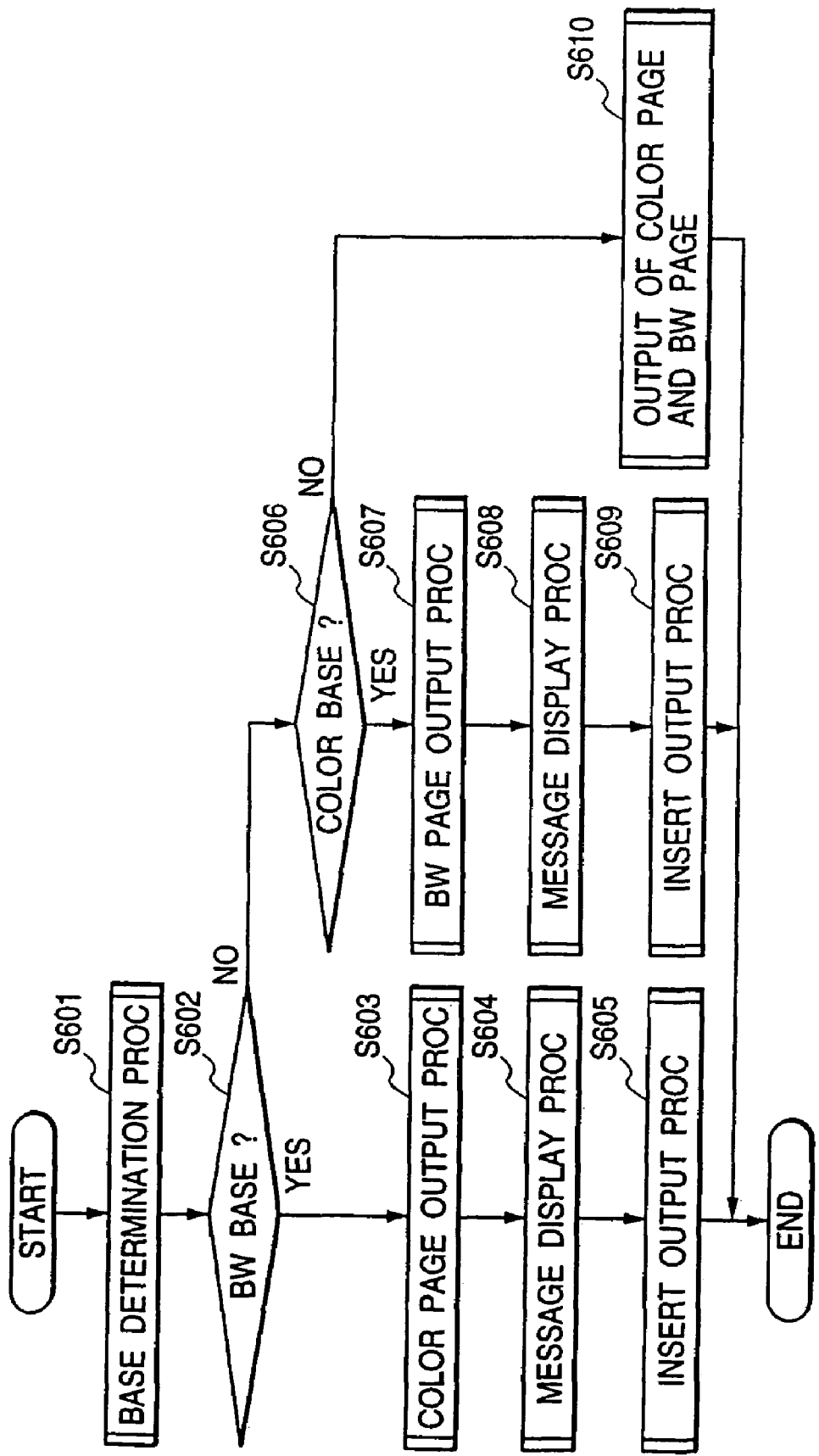
FIG. 6 is a flow chart showing output processing in the image print system of FIG. 1.

FIG. 6 is the flow chart showing the output processing procedure in the image print system of FIG. 1. In FIG. 6, when the print server 104 receives data (including the image data, the above instruction data, and the like) from the host computer 101, the print server 104 once stores the received data in its memory and performs base determination processing shown in FIG. 7. Thus, from among the connected color copying machine 105 and BW digital copying machine 106, the print server 104 determines the copying machine acting as the output base (step S601).

Figure 8:
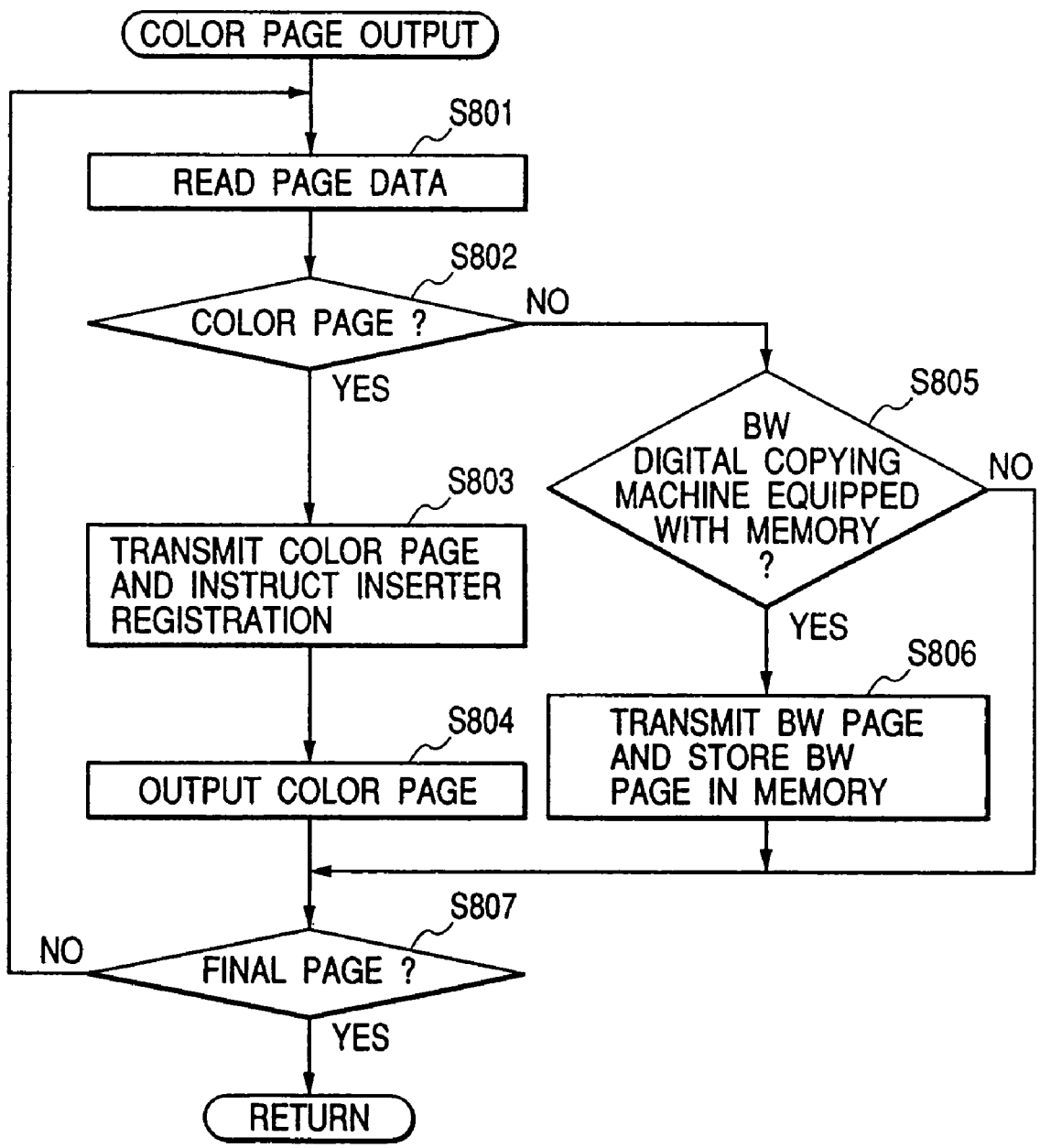
FIG. 8 is a flow chart showing color page output processing in a step S603 of FIG. 6.
Figure 12:
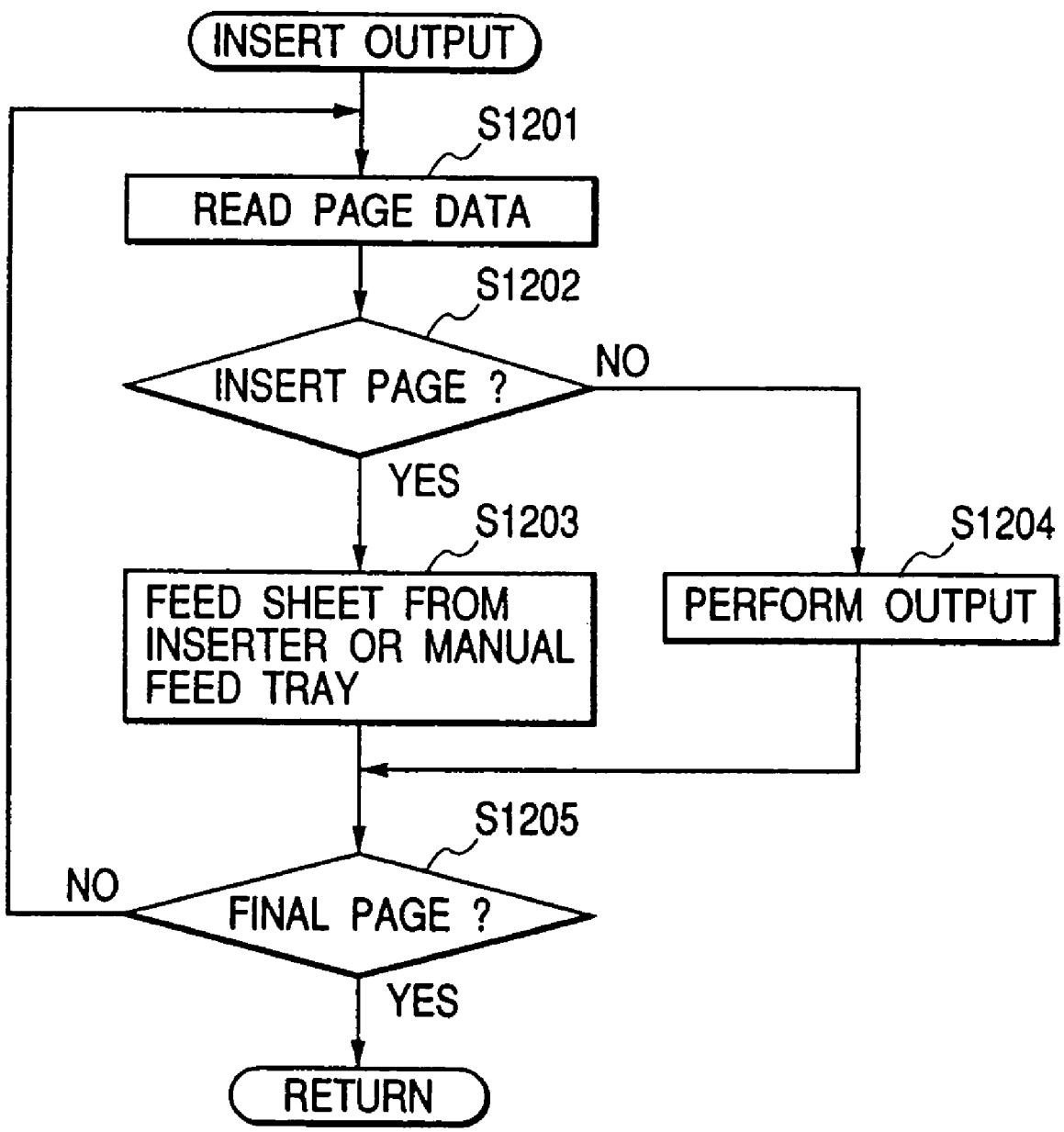
FIG. 12 is a flow chart showing insert output processing in steps S605 and S609 of FIG. 6.

Next, it is judged whether or not the determined base is the BW base (i.e., the BW digital copying machine 106) (step S602). When judged that the determined base is the BW base (the BW digital copying machine 106), later-described color page output processing shown in FIG. 8 is performed, whereby the color pages are output (step S603). Next, in later-described message display processing shown in FIG. 10, a message is displayed to cause the user to set the color pages output by the BW digital copying machine 106 (step S604). Then later-described insert output processing shown in FIG. 12 is performed (step S605), and the processing ends, whereby the output result mixedly including the BW and color pages can be obtained. Namely, sheets on which BW images are formed and sheets on which color images are formed are mixed in due page order to constitute a sheaf of sheets, and this sheaf of sheets is stacked on a sheet discharge unit of the BW digital copying machine 106.

Figure 9:
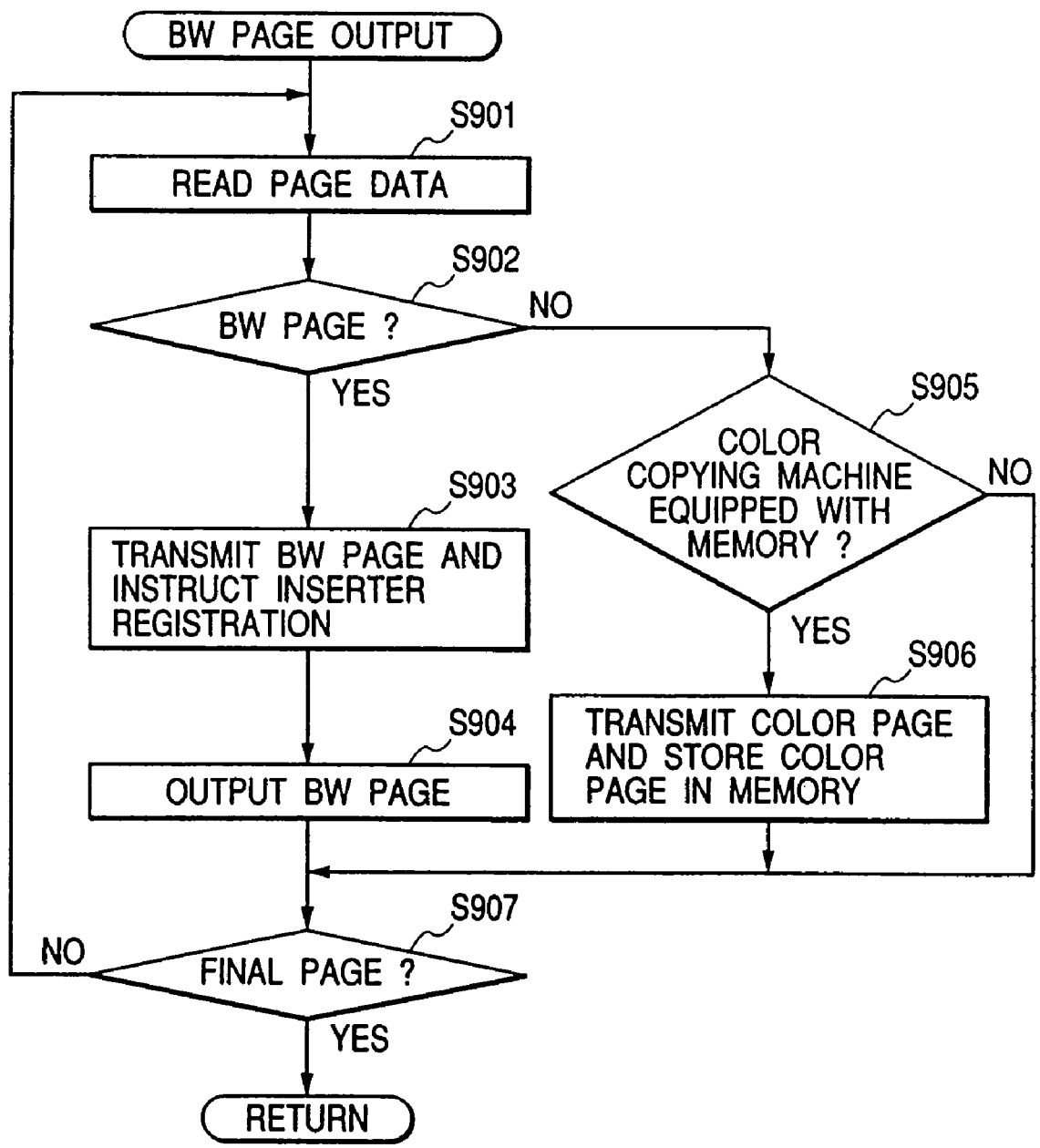
FIG. 9 is a flow chart showing BW page output processing in a step S607 of FIG. 6.

Conversely, when judged in the step S602 that the determined base is not the BW base (the BW digital copying machine 106), it is further judged whether or not the determined base is the color base (the color copying machine 105) (step S606). When judged that the determined base is the color base, later-described BW page output processing shown in FIG. 9 is performed, whereby the BW pages are output (step S607). Next, in later-described message display processing shown in FIG. 11, a message is displayed to cause the user to set the BW pages output by the color copying machine 105 (step S608). Then the later-described insert output processing shown in FIG. 12 is performed (step S609), and the processing ends, whereby the output result mixedly including the BW and color pages can be obtained. Namely, sheets on which BW images are formed and sheets on which color images are formed are mixed in due page order to constitute a sheaf of sheets, and this sheaf of sheets is stacked on a sheet discharge unit of the color copying machine 105.

Conversely, when judged in the step S606 that the determined base is not even the color base (the color copying machine 105), i.e., when it is determined in the step S601 that there is no base, the image data of the color pages is transmitted to the color copying machine 105 and output, while the image data of the BW pages is transmitted to the BW digital copying machine 106 and output, and the processing ends (step S610).

Figure 7:
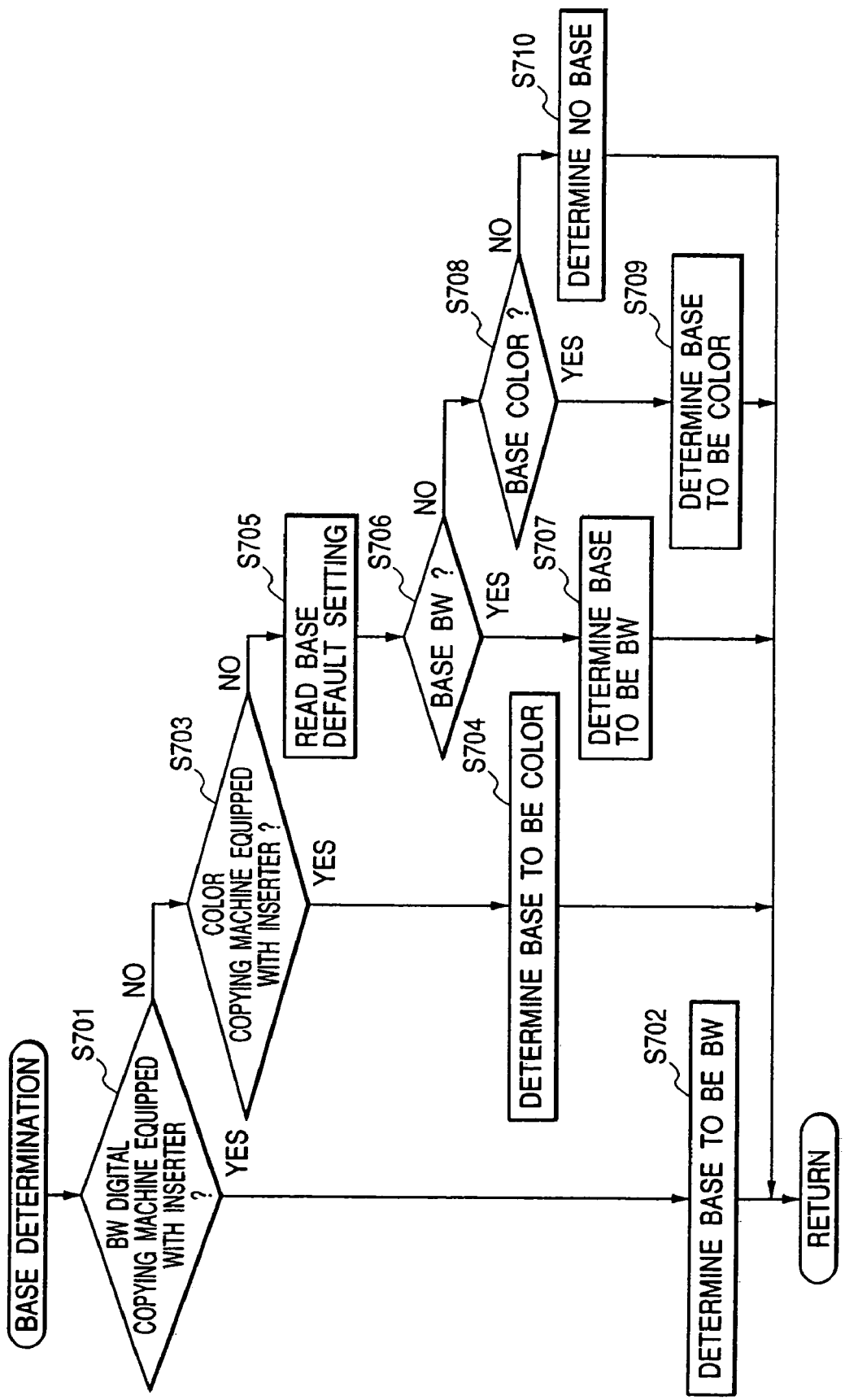
FIG. 7 is a flow chart showing base determination processing in a step S601 of FIG. 6.

Next, the detailed processing in the step S601 of FIG. 6 will be explained with reference to FIG. 7. FIG. 7 is a flow chart showing the base determination processing in the step S601 of FIG. 6.

First, the print server 104 judges whether or not the BW digital copying machine 106 is equipped with the inserter 222, on the basis of management information acquired from the image formation apparatus 106 through the communication path or previously stored in the memory contained within the server 104 itself (step S701). When judged that the BW digital copying machine 106 is equipped with the inserter 222, the BW digital copying machine 106 is determined as the output base (step S702), and the processing ends.

Conversely, when judged in the step S701 that the BW digital copying machine 106 is not equipped with the inserter 222, the print server 104 further judges whether or not the color copying machine 105 is equipped with the inserter 222 on the basis of the management information acquired from the image formation apparatus 105 through the communication path or previously stored in the memory contained within the server 104 itself (step S703). When judged that the color copying machine 105 is equipped with the inserter 222, the color copying machine 105 is determined as the output base (step S704), and the processing ends.

Conversely, when judged in the step S703 that the color copying machine 105 is not equipped with the inserter 222, the print server 104 reads base default setting which has been previously set by the user from the memory of the print server 104 itself (step S705). When none of the color copying machine 105 and the BW digital copying machine 106 is equipped with the inserter, this base default setting enables either one of these two copying machines to output the data. In any case, it is judged whether or not the read base default setting is based on the BW digital copying machine 106 (step S706). When judged that the setting is based on the BW digital copying machine 106, the BW digital copying machine 106 is determined as the output base (step S707), and the processing ends.

Conversely, when judged in the step S706 that the base default setting is not based on the BW digital copying machine 106, it is further judged whether or not the read base default setting is based on the color copying machine 105 (step S708). When judged that the setting is based on the color copying machine 105, the color copying machine 105 is determined as the output base (step S709), and the processing ends. Conversely, when judged in the step S708 that the base default setting is not based on even the color copying machine 105, it is determined that there is no base (step S710), and the processing ends.

Next, the detailed processing procedure in the step S603 of FIG. 6 will be explained with reference to FIG. 8. FIG. 8 is a flow chart showing the color page output processing in the step S603 of FIG. 6.

Figure 10:
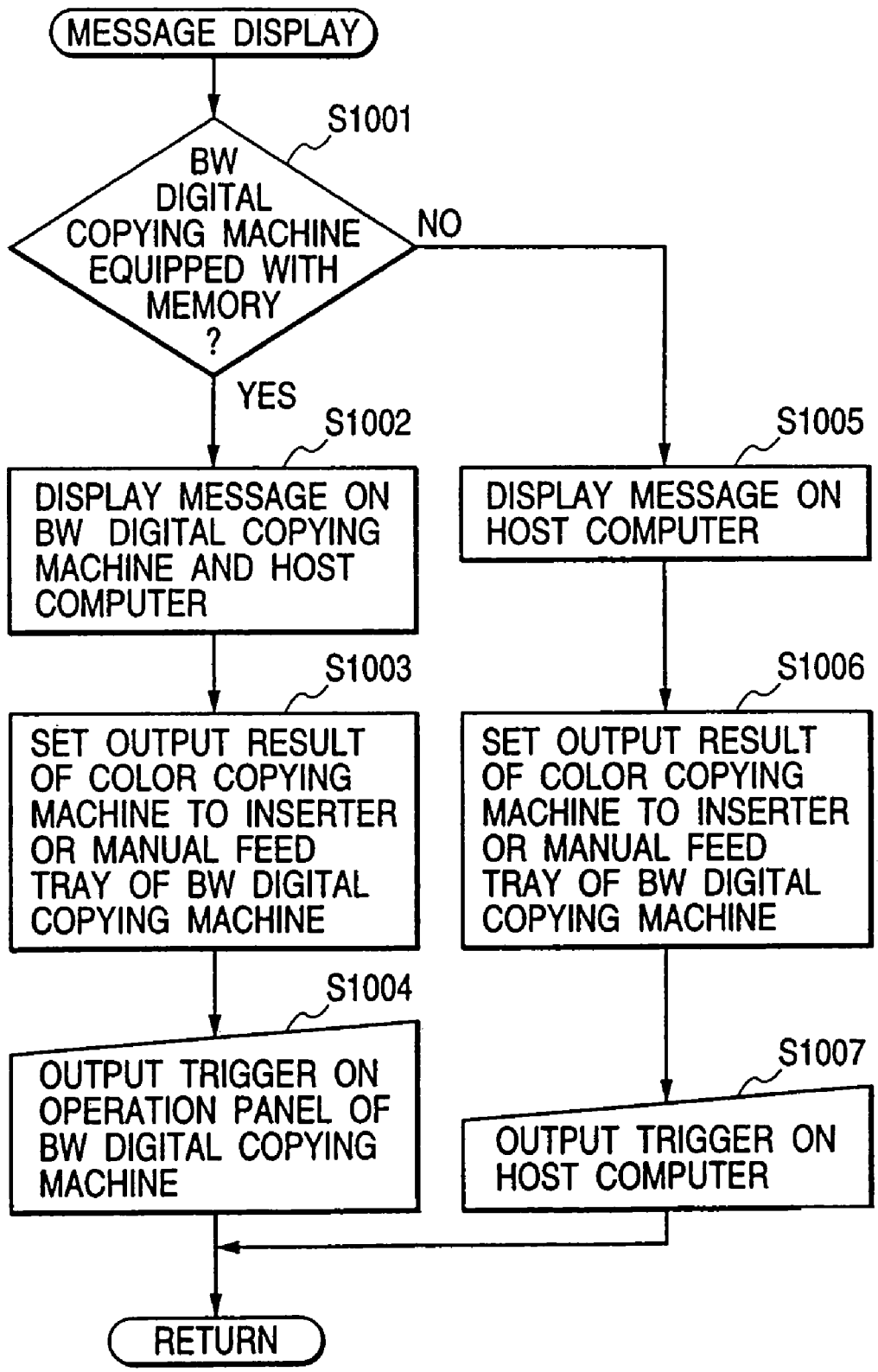
FIG. 10 is a flow chart showing message display processing in a step S604 of FIG. 6.

The print server 104 reads the data for each page as page data (step S801). Next, it is judged whether or not the read page data is color data (representing a color page) (step S802). When judged that the page data is the color data, this page data is transmitted to the color copying machine 105, and also inserter (data) registration to feed the color pages from the inserter 222 or the manual sheet feeder 227 and output the fed color pages in the later-described message display processing of FIG. 10 is instructed (step S803). When the color copying machine 105 has the spooling function, the transmitted color page data is once stored in the storage device of the color copying machine 105.

Next, when the color page data is output by the color copying machine 105 (step S804), then it is judged whether or not the read page data represents the final page (step S807). When judged that the read page data does not represent the final page, the flow returns to the step S801. Conversely, when judged in the step S807 that the read page data represents the final page, the processing ends.

When judged in the step S802 that the read page data is not the color data, then it is judged whether or not the BW digital copying machine 106 connected to the print server 104 is equipped with the storage device such as a hard disk, a memory or the like capable of spooling the data, on the basis of the management information directly acquired from the image formation apparatus (i.e., the BW digital copying machine) 106 through the communication path or previously stored in the inner memory (step S805).

When judged in the step S805 that the BW digital copying machine 106 is equipped with the storage device capable of spooling the data, the page data is transmitted to the BW digital copying machine 106 and stored in the storage device thereof (step S806). Then, after the processing in the step S807 is performed, the processing ends.

Conversely, when judged in the step S805 that the BW digital copying machine 106 is not equipped with the storage device capable of spooling the data, the BW page data is stored in the print server 104 as it is. Then, after the processing in the step S807 is performed, the processing ends.

Next, the detailed processing procedure in the step S607 of FIG. 6 will be explained with reference to FIG. 9. FIG. 9 is a flow chart showing the BW page output processing in the step S607 of FIG. 6.

Figure 11:
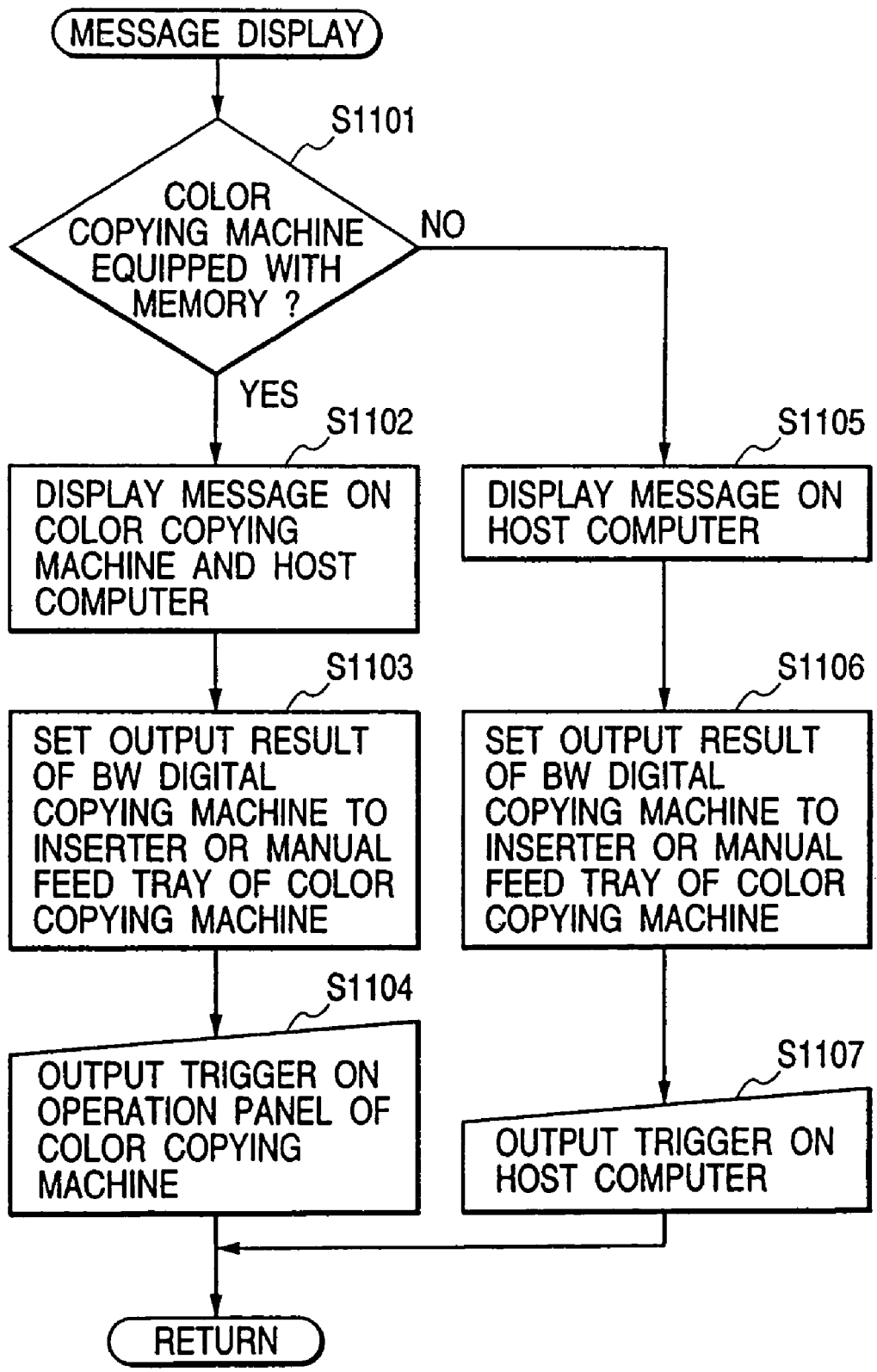
FIG. 11 is a flow chart showing message display processing in a step S608 of FIG. 6.

The print server 104 reads the data for each page as page data (step S901). Next, it is judged whether or not the read page data is BW data (representing a BW page) (step S902). When judged that the page data is the BW data, this page data is transmitted to the BW digital copying machine 106, and also inserter (data) registration to feed the BW pages from the inserter 222 or the manual sheet feeder 227 in the later-described message display processing of FIG. 11 is instructed (step S903). When the BW digital copying machine 106 has the spooling function, the transmitted BW page data is once stored in the storage device of the BW digital copying machine 106.

Next, when the BW page data is output by the BW digital copying machine 106 (step S904), then it is judged whether or not the read page data represents the final page (step S907). When judged that the read page data does not represent the final page, the flow returns to the step S901. Conversely, when judged in the step S907 that the read page data represents the final page, the processing ends.

When judged in the step S902 that the read page data is not the BW data, then it is judged whether or not the color copying machine 105 connected to the print server 104 is equipped with the storage device such as a hard disk, a memory or the like capable of spooling the data, on the basis of the management information directly acquired from the image formation apparatus (i.e., the color copying machine)

105 through the communication path or previously stored in the inner memory (step S905).

When judged in the step S905 that the color copying machine 105 is equipped with the storage device capable of spooling the data, the page data is transmitted to the color copying machine 105 and stored in the storage device thereof (step S906). Then, after the processing in the step S907 is performed, the processing ends. Conversely, when judged in the step S905 that the color copying machine 105 is not equipped with the storage device capable of spooling the data, the color page data is stored in the print server 104 as it is. Then, after the processing in the step S907 is performed, the processing ends.

Next, the detailed processing procedure in the step S604 of FIG. 6 will be explained with reference to FIG. 10. FIG. 10 is a flow chart showing the message display processing in the step S604 of FIG. 6.

The print server 104 judges whether or not the BW digital copying machine 106 is equipped with the storage device capable of spooling the data, on the basis of the management information directly acquired from the image formation apparatus (i.e., the BW digital copying machine) 106 through the communication path or previously stored in the inner memory (step S1001). When judged that the BW digital copying machine 106 is equipped with the storage device capable of spooling the data, a message that the color page output ended is displayed on the LCD touch panel 316 of the BW digital copying machine 106 and the display screen of the host computer 101 being the image data transmission source, to notify the user of such a fact (step S1002).

Figure 15:
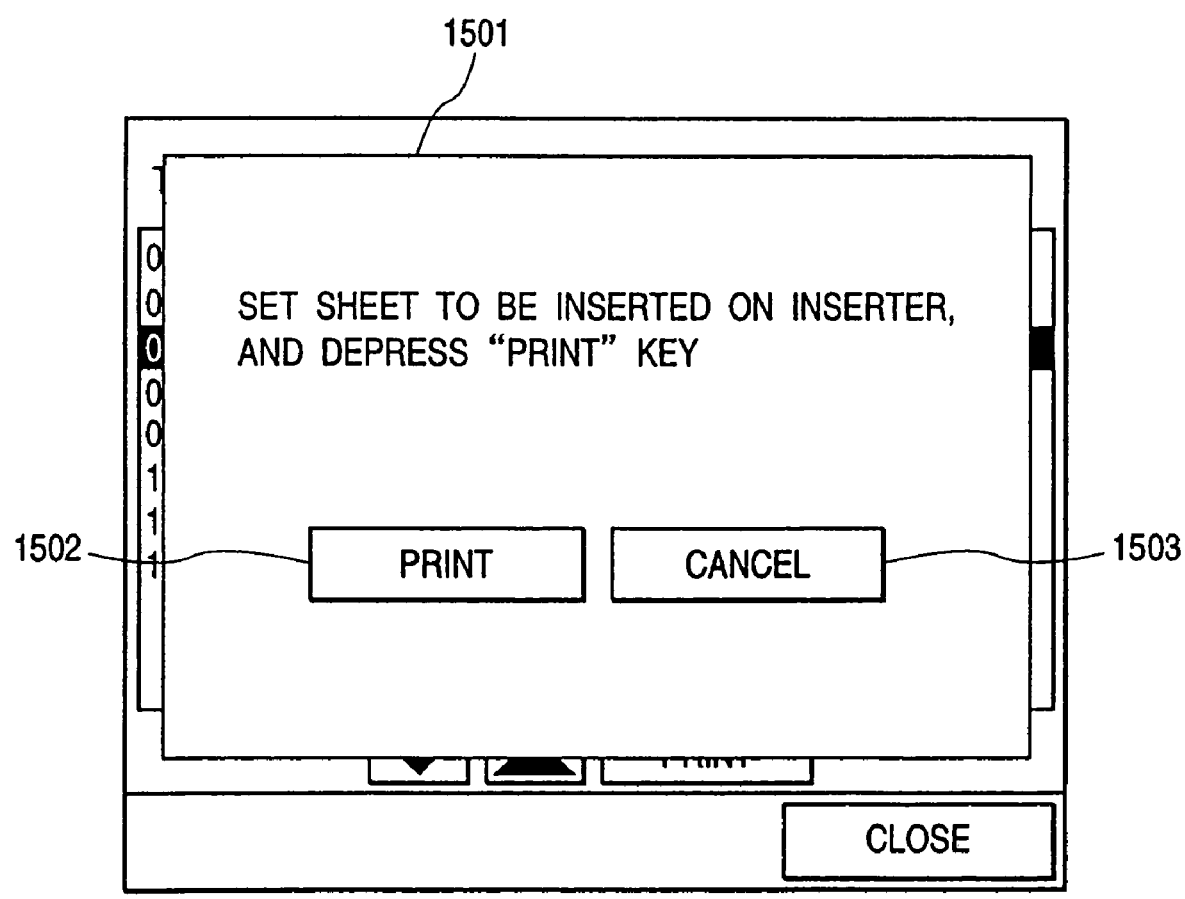
FIG. 15 is a diagram showing a print trigger screen of FIG. 14.

Next, the color page output result (i.e., a group of the sheets on which the color images were formed) is manually set to the inserter 222 or the manual sheet feeder 227 of the BW digital copying machine 106 by the user (step S1003). Then a later-described content shown in FIG. 15 is displayed on the screen of the LCD touch panel 316 of the BW digital copying machine 106 (step S1004), whereby a screen state from which the output trigger can be generated is set, and the processing ends.

Figure 16:
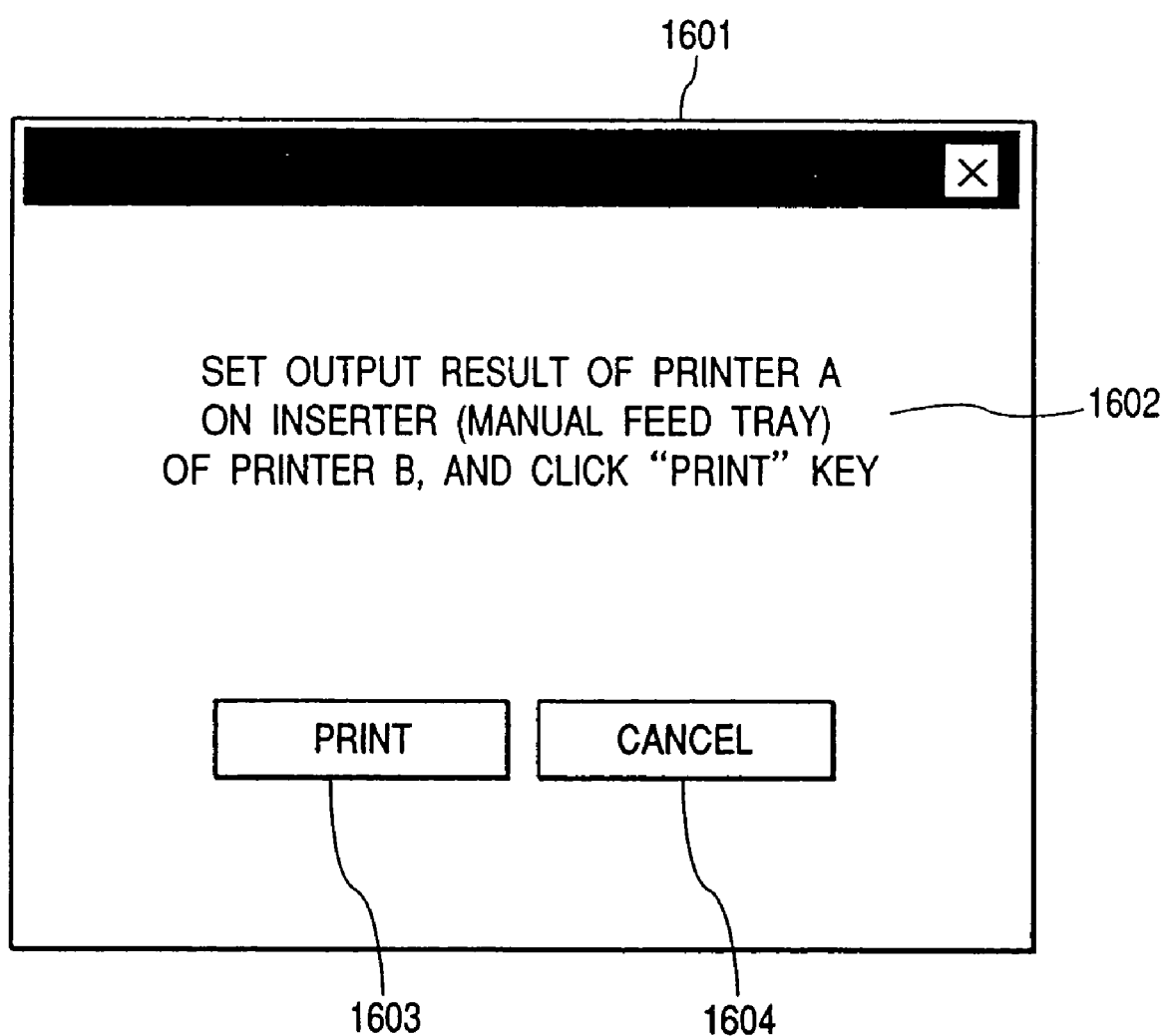
FIG. 16 is a diagram showing an operation indication message screen on the host computer 101 of FIG. 1.

Conversely, when judged in the step S1001 that the BW digital copying machine 106 is not equipped with the storage device capable of spooling the data, a later-described content shown in FIG. 16 is displayed on the display screen of the host computer 101 (step S1005). Next, the color page output result is manually set to the inserter 222 or the manual sheet feeder 227 of the BW digital copying machine 106 by the user (step S1006). Then a screen state on the host computer 101 from which the output trigger can be generated is set, and the processing ends (step S1007).

Next, the detailed processing procedure in the step S608 of FIG. 6 will be explained with reference to FIG. 11. FIG. 11 is a flow chart showing the message display processing in the step S608 of FIG. 6.

The print server 104 judges whether or not the color copying machine 105 is equipped with the storage device capable of spooling the data, on the basis of the management information directly acquired from the image formation apparatus (i.e., the color copying machine) 105 through the communication path or previously stored in the inner memory (step S1101). When judged that the color copying machine 105 is equipped with the storage device capable of spooling the data, a message that the color page output ended in the BW digital copying machine 106 is displayed on the LCD touch panel 316 of the color copying machine 105 and the display screen of the host computer 101, to notify the user of such a fact (step S1102).

Next, the BW page output result is manually set to the inserter 222 or the manual sheet feeder 227 of the color copying machine 105 by the user (step S1103). Then the later-described content shown in FIG. 15 is displayed on the screen of the LCD touch panel 316 of the color copying machine 105 (step S1104), whereby a screen state from which the output trigger can be generated is set, and the processing ends.

Conversely, when judged in the step S1101 that the color copying machine 105 is not equipped with the storage device capable of spooling the data, the later-described content shown in FIG. 16 is displayed on the display screen of the host computer 101 (step S1105). Next, the color page output result is manually set to the inserter 222 or the manual sheet feeder 227 of the color copying machine 105 by the user (step S1106). Then the screen state on the host computer 101 from which the output trigger can be generated is set, and the processing ends (step S1107).

Next, the detailed processing procedure in the steps S605 and S609 of FIG. 6 will be explained with reference to FIG. 12. FIG. 12 is a flow chart showing the insert output processing in the steps S605 and S609 of FIG. 6.

The print server 104 reads the page data from the storage device when the data has been stored in the storage device of each of the connected color copying machine 105 and BW digital copying machine 106 or reads the page data received from the print server 104 when the copying machine is not equipped with the storage device (step S1201). Then it is judged whether or not the read page data represents an insert page which has been subjected to the inserter registration in the step S803 of FIG. 8 and the step S903 of FIG. 9 (step S1202).

When judged that the read page data represents the insert page, the output result (the sheets) set in the step S1003 of FIG. 10 and the step S1103 of FIG. 11 are fed one by one from the inserter 222 or the manual sheet feeder 227 (step S1203). Next, it is judged whether or not the page data read in the step S1201 represents a final page (step S1205). When judged that the read page data does not represent the final page, the flow returns to the step S1201. Conversely, when judged that the read page data represents the final page, the processing ends.

On the other hand, when judged in the step S1202 that the read page data does not represent the insert page, the read page data is output (step S1204), the processing in the step S1205 is performed, and the processing ends.

Next, the message display screens in the step S1002 of FIG. 10 and the step S1102 of FIG. 11 will be explained with reference to FIGS. 13, 14 and 15.

Figure 13:
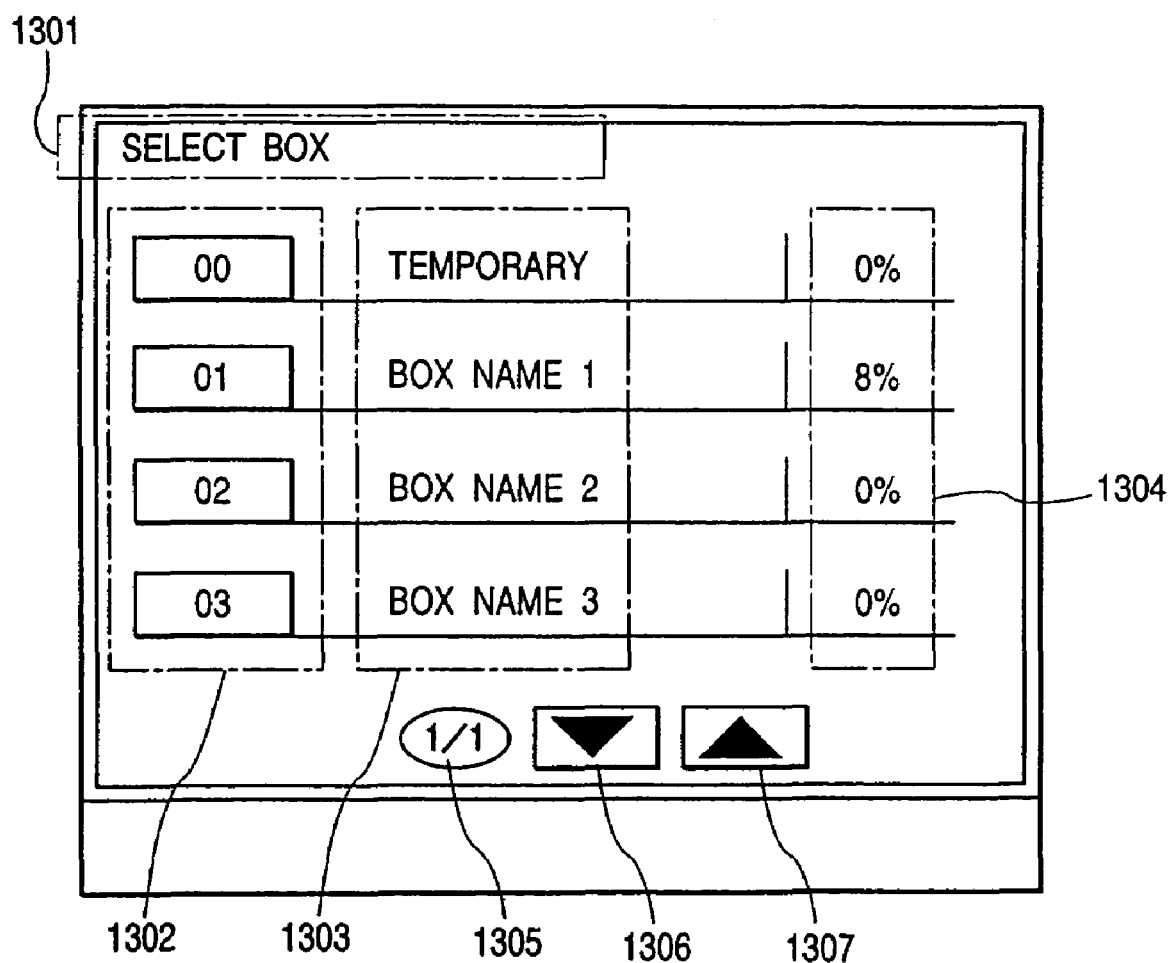
FIG. 13 is a diagram showing a base screen of a mailbox screen in the color copying machine 105, the BW digital copying machine 106 and a host computer 101 of FIG. 1.

FIG. 13 is a diagram showing the base screen of the mailbox screen in the color copying machine 105, the BW digital copying machine 106 and the host computer 101 of FIG. 1. In FIG. 13, a message line 1301 displays a message which should direct the user. When one of box keys 1302 is depressed, the screen is changed to a temporary screen (later-described FIG. 14) on which a job list stored in each box is displayed. The user can freely define a name of each box in a box name area 1303.

In FIG. 13, a box "00" has been reserved as a temporary area. In case of storing the data transmitted from the print server 104, such the data is automatically input to this box "00". Memory use quantity display 1304 displays the proportion of data in each box to the entire storage capacity by a percentage. Page display 1305 displays the number of total pages on the screen as a denominator and the current page number as a numerator. The page of the box list screen can be changed by using a downward scroll key 1306 and an upward scroll key 1307.

Figure 14:
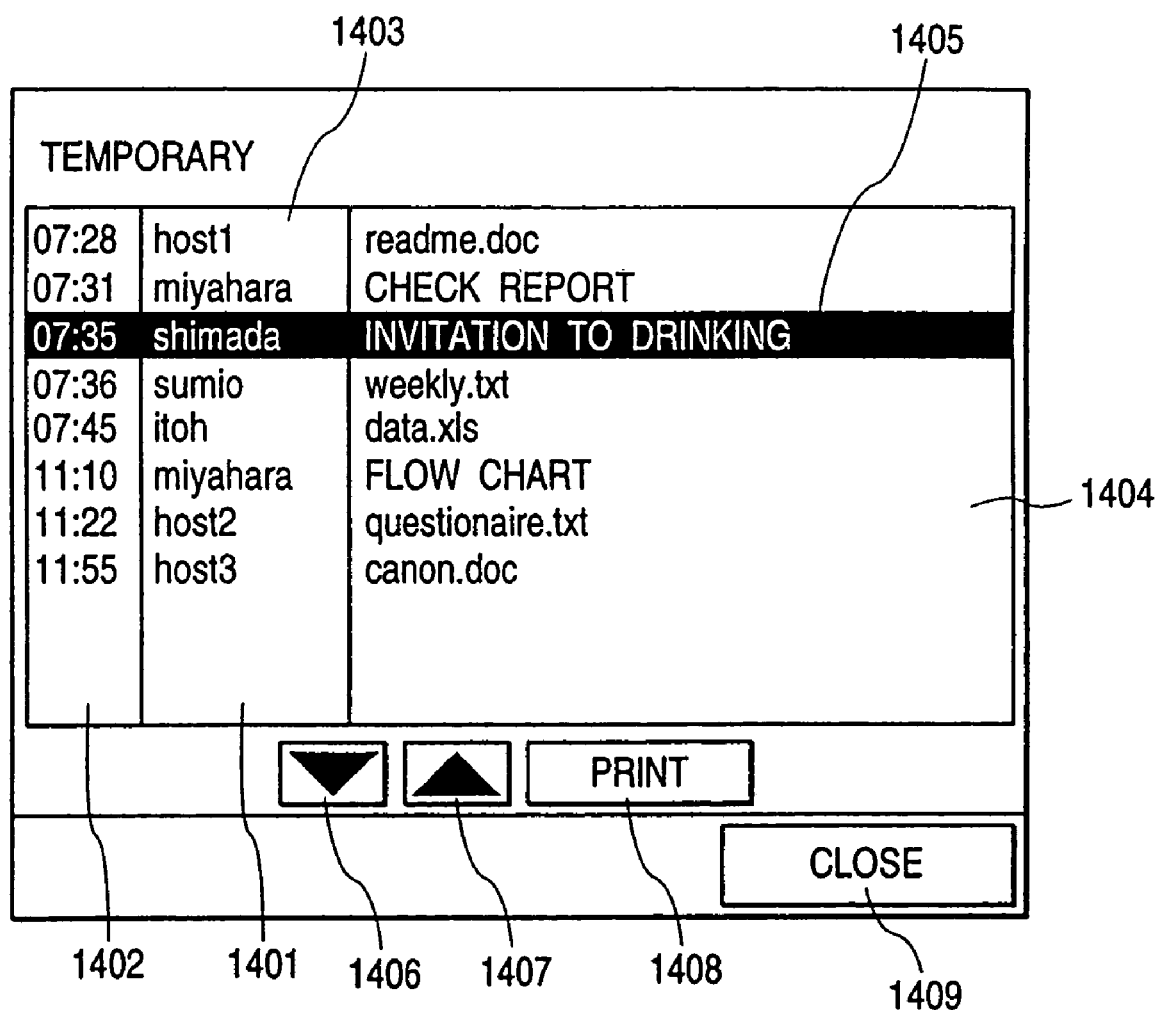
FIG. 14 is a diagram showing a temporary box screen of the mailbox screen of FIG. 13.

FIG. 14 is a diagram showing the temporary box screen of the mailbox screen shown in FIG. 13. The temporary box screen of FIG. 14 is changed by depressing one of the box keys 1302 in FIG. 13, and a print job within the box can be selected and output on the temporary box screen. A job list 1401 is composed of a reception time area 1402, a host name area 1403, and a print job name area 1404. When the user touches the field at somewhere in the areas 1402 to 1404 and thus selects the print job, the selected display (a selected print job 1405) is highlighted as shown in FIG. 14. In this state, the output is started when a print key 1408 is depressed.

When the selected print job is executed in an output condition that an insert or a slipsheet is to be inserted, the screen is changed to the later-described screen shown in FIG. 15 to wait for a user's instruction. When the job list in the box can not be contained within one screen, the job list display can be scrolled by using a downward scroll key 1406 and an upward scroll key 1407. When a close key 1409 is depressed, the screen is changed to the base screen of the mailbox screen shown in FIG. 13.

FIG. 15 is a diagram showing the print trigger screen of FIG. 14. When the print job is selected and the print key 1408 is depressed in FIG. 14, if the selected print job is in the output condition that the insert is to be inserted by using the inserter 222 or the like, the screen is changed to a print trigger window 1501 of FIG. 15.

Next, the output result previously output by the color copying machine 105 or the BW digital copying machine 106 is set to the inserter 222 or the like as it is. Then, when a print key 1502 is depressed, the output is started. When a cancel key 1503 is depressed, the print trigger window 1501 is closed, and the screen is returned to the temporary box screen of FIG. 14.

It should be noted that, when the screens shown in FIGS. 13 to 15 are displayed on the LCD touch panel of the color copying machine 105 or the BW digital copying machine 106, the above keys are depressed on the screen. On the other hand, when these screens are displayed on the host computer 101, the instructions corresponding to the above keys are input by using a mouse, a keyboard and the like (not shown).

Next, the message display screens in the step S1005 of FIG. 10 and the step S1105 of FIG. 11 will be explained with reference to FIG. 16. FIG. 16 is a diagram showing an operation indication message screen on the host computer 101 of FIG. 1.

When the output result to be set to the color copying machine 105 or the BW digital copying machine 106 being the determined base is output, if the copying machine is not equipped with the storage device capable of spooling the data, an operation indication message window 1601 of FIG. 16 is displayed on the screen of the host computer 101.

A message 1602 urges the user to generate an output trigger. In the message 1602, a name of the copying machine being not the base on the network is displayed as "PRINTER A", and a name of the copying machine being the base on the network is displayed as "PRINTER B". After the user sets either one of the color and BW output results to the inserter 222 of the base copying machine, when a print key 1603 is clicked by the mouse or the like, the output trigger can be generated to the base copying machine. When the user wishes to stop the output, a cancel key 1604 is depressed, According to the embodiment of the present invention, when the image data mixedly including the BW and color images is received from the host computer 101, the print server 104 determines one of the connected color copying machine 105 and BW digital copying machine 106 equipped with the inserter as the base copying machine (step S601 of FIG. 6). Next, it is judged whether the received data is based on BW or color (step S802 of FIG. 8 and step S902 of FIG. 9). When the determined base is the BW base, the color page data is first transmitted and thus the color page is output (step S804 of FIG. 8), the output color page is set to the BW digital copying machine 106, and the insert output is performed (step S1204 of FIG. 12). Conversely, when the determined base is the color base, the BW page data is first transmitted and thus the BW page is output (step S904 of FIG. 9), the output BW page is set to the color copying machine 105, and the insert output is performed (step S1204 of FIG. 12). Thus, it is possible to effectively use the installations of the image output apparatus, and thus shorten the time necessary to output the image data mixedly including the BW and color images to the image output apparatus.

In the present embodiment, the example of the data mixedly representing the color and BW images was explained as an example of data mixedly including plural different kinds of data. However, for example, the present invention is applicable to a case where data mixedly representing a photograph image and a character image is input to the print server 104, the photograph image is output by the color image formation apparatus 105, and the character image is output by the BW image formation apparatus 106.

Further, of course, the present invention is applicable to a case where the print server 104 distributes same-kind data to the copying machines 105 and 106. For example, it is thought that, when the BW image data represents the images of total 20 pages, the print server 104 causes the color copying machine 105 to output the first to tenth pages and the BW digital copying machine 106 to output the eleventh to twentieth pages.

Namely, even when a part of pages represented by the series of image data are distributed to one image formation apparatus (e.g., the color copying machine 105) and the remaining pages are distributed to the other image formation apparatus (e.g., the BW digital copying machine 106), the same processing as that shown in FIGS. 6 to 12 is performed. Thus, the present invention is applicable to such the case, by distributing the data to each image formation apparatus at optimum timing on the basis of the function and the installation state of each image formation apparatus.

It is needless to say that the object of the present invention can be achieved in a case where a storage medium storing program codes of software for realizing the function of the various processing (e.g., the processing shown in FIGS. 6 to 12) in the above present embodiment is supplied to a system or an apparatus and then a computer (or CPU or MPU) in the system or the apparatus reads and executes the program codes stored in the memory medium.

In this case, the program codes themselves read from the storage medium realize the function of the embodiment, and the storage medium storing such the program codes constitutes the present invention.

The storage medium storing the program codes can be, e.g., a floppy disk, a hard disk, an optical disk, a magnetooptical disk, a CD-ROM, a CD-R, a magnetic tape, a non-volatile memory card, a ROM, or the like.

It is needless to say that the present invention also includes not only the case where the function of the embodiment is realized by executing the program codes read by the computer, but also a case where an OS (operating system) or the like functioning on the computer executes all or part of the processing according to instructions of the program codes, thereby realizing the function of the embodiment.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all or part of the processing according to instructions of such program codes, thereby realizing the function of the embodiment.

As detailedly explained above, in the present embodiment, between the BW image formation apparatus and the color image formation apparatus to which the data is distributed, one image formation apparatus which is equipped with the inserter having the sheet path without fixing unit is determined as the base image formation apparatus. In this structure, the inserter has the insert function which can feed the sheet on which the image was previously formed without being formed by the image formation apparatus itself. Then, the image data mixedly representing BW and color images and transmitted from the image generation source such as the host computer or the like is read for each page, and it is judged whether the read page is the color page or the BW page. When the determined base is the BW image formation apparatus, the judged color page is first transmitted to the color image formation apparatus and printed. Conversely, when the determined base is the color image formation apparatus, the judged BW page is first transmitted to the BW image formation apparatus and printed. Then, it is instructed that the base image formation apparatus inserts therein one of the BW page and the color page first print-processed and set to the inserter as it outputs the other thereof. Thus, it is possible to effectively use the predetermined installations of the image formation apparatuses, and thus shorten the time occupied to output the image data mixedly including the BW and color images by the image formation apparatus.

Further, in a series of work processing in which an operator takes part as in the present embodiment, notifications to the operator are aggressively performed at optimum timing to improve usability or maneuverability for the operator. Namely, it is determined according to the state on the image formation apparatus side whether the predetermined message and the setting screen are displayed on either one of the display unit of the host computer and the display unit of the image formation apparatus or both the display units. Further, it is controlled to make the content to be displayed differ appropriately in accordance with the state on the image formation apparatus side. Thus, it is possible to increase the usability or maneuverability for the operator, and thus to prevent an erroneous operation by the operator.

As above, according to the present embodiment, in the case where the series of image data composed of the plural pages is distributed to the plural image formation apparatuses for each page and then the image formation is performed by each image formation apparatus, it is possible to distribute the data in consideration of the state of the image formation apparatus side, quickly output the data desired by the user, and smoothly operate the entire system.

What is claimed is:

1. A method of operating a system which includes at least one of a plurality of devices, the plurality of devices including a first printing device comprising a memory unit for enabling storage of a plurality of printable data and a second printing device, said method comprising the steps of:

causing the first printing device to execute a first printing operation and causing the second printing device to execute a second printing operation; and causing, in the case that the first printing device has an inserter function for enabling an insertion process of a sheet from a predetermined sheet supply for a sheet from a sheet supply source in the first printing operation, the first printing device to operate so that the first printing operation is started after the second printing operation was started when the inserter function in the first printing operation is used.

2. An operating method according to claim 1, wherein, said method causes, in the case where the inserter function is used in the first printing operation so as to insert a second type of sheet supplied from the predetermined sheet supply source for a first type of sheet supplied from the sheet supply source, the first printing device to operate so that the first printing operation is started after the second printing operation was started.

3. An operating method according to claim 2, wherein at least a type of data to be printed on the first type of sheet is different from a type of data to be printed on the second type of sheet.

4. An operating method according to claim 1, wherein, said method causes, in the case where the inserter function is used in the first printing operation so as to insert the sheet supplied from the predetermined sheet supply source and print-processed in the second printing operation for the sheet supplied from the sheet supply source and print-processed in the first printing operation, the first printing device to operate so that the first printing operation is started after the second printing operation was started.

5. An operating method according to claim 4, wherein said method includes:

causing a first image forming apparatus and a second image forming apparatus to perform a distributed printing operation which distributes the printing operation of the data output from one data supply source to the first printing operation by the first printing device and the second printing operation by the second printing device; and causing, in the case where the inserter function is used in the first printing operation so as to insert the sheet supplied from the predetermined sheet supply source and print-processed in the second printing operation as the distributed printing operation for the sheet print-processed in the first printing operation as the distributed printing operation, the first printing device to operate so that the first printing operation is started after the second printing operation was started.

6. An operating method according to claim 5, wherein the distributed printing operation includes a printing operation to cause the first printing device to perform the printing operation of a part of a series of data consisting of plural pages output from one data supply source and to cause the second printing device to perform the printing operation of other part of the series of data.

7. An operating method according to claim 5, wherein the distributed printing operation includes a printing operation to cause the first printing device to perform the printing operation of partial page of a series of data consisting of plural pages output from one data supply source and to cause the second printing device to perform the printing operation of other page of the series of data.

8. An operating method according to claim 5, wherein the distributed printing operation includes a printing operation to cause the first printing device to perform the printing operation of the first type of data included in a series of data mixedly composed of the first type of data and the second type of data output from one data supply source and to cause the second printing device to perform the printing operation of the second type of data included in the series of data.

9. An operating method according to claim 8, wherein the first type of data is black and white data and the second type of data is color data.

10. An operating method according to claim 8, wherein the first type of data is photograph data and the second type of data is character data.

11. An operating method according to claim 5, wherein the data supply source includes a computer, and the first and second printing devices can respectively perform the printing operations of the data output by the computer.

12. An operating method according to claim 11, wherein the first and second printing devices can receive the data output by a first computer through a second computer.

13. An operating method according to claim 11, wherein the first printing device has a scanner unit, and the data from the scanner unit can be printed by the first printing device through the memory unit.

14. An operating method according to claim 5, further comprising a step of enabling the data supply source to confirm function information of the first printing device.

15. An operating method according to claim 14, further comprising a step of enabling the data supply source to confirm function information of the second printing device.

16. An operating method according to claim 5, further comprising a step of causing a user interface unit of the data supply source to notify the user of information for enabling the user to discriminate that the second printing operation in the second printing device was finished.

17. An operating method according to claim 1, further comprising a step of causing an operation unit of at least one of the first and second printing devices to notify the user of information for enabling the user to discriminate that the second printing operation in the second printing device was finished.

18. An operating method according to claim 5, further comprising a step of causing a user interface unit of the data supply source to notify the user of message information for enabling the user to confirm an action which should be performed by the user when the first printing operation in the first printing device is performed.

19. An operating method according to claim 1, further comprising a step of causing an operation unit of at least one of the first and second printing devices to notify the user of message information for enabling the user to confirm an action which should be performed by the user when the first printing operation in the first printing device is performed.

20. An operating method according to claim 1, wherein an occupation time of the first printing device for the first printing operation is shortened by operating the first printing device so that the first printing operation is started after the second printing operation was started.

21. A computer readable medium storing a program executing a method of operating a system which includes at least one of a plurality of devices, the plurality of devices including a first printing device comprising a memory unit for enabling storage of a plurality of printable data and a second printing device, said method comprising the steps of:
  causing the first printing device to execute a first printing operation and causing the second printing device to execute a second printing operation; and
  causing, in the case where the first printing device has an inserter function for enabling an insert process of a sheet from a predetermined sheet supply source for a sheet from a sheet supply source in the first printing operation, the first printing device to operate so that the first printing operation is started after the second printing operation was started when the inserter function in the first printing operation is used.

22. An operating system which includes at least one of a plurality of devices, the plurality of devices including a first printing device comprising a memory unit for enabling storage of a plurality of printable data and a second printing device, said system further comprising:
  an operation unit adapted to cause the first printing device to execute a first printing operation and to cause the second printing device to execute a second printing operation; and
  a control unit adapted to cause, in the case where the first printing device has an inserter function for enabling an insert process of a sheet from a predetermined sheet supply source for a sheet from a sheet supply source in the first printing operation, the first printing device to operate so that the first printing operation is started after the second printing operation was started when the inserter function in the first printing operation is used.

23. A method of operating a system which includes at least one of a plurality of devices, the plurality of devices including a first printing device comprising a memory unit capable of storing a plurality of printable data and a second printing device, said method comprising the steps of:
  causing the first printing device to execute a first printing operation based on first data output from a same data source as a data source which can output second data of an object to be printed in a second printing operation by the second printing device; and
  causing, in the case where the first printing device has an inserter function for enabling an insert process of sheet from a predetermined sheet supply source for a sheet from a sheet supply source in the first printing operation, the first printing device to operate so that the first data is stored in the memory unit of the first printing device before the second printing operation by the second printing device is finished and the first printing operation based on the first data of the memory unit can be started after the second printing operation is finished when the inserter function in the first printing operation is used.

24. An operating method according to claim 23, wherein said method causes, in the case where the inserter function is used in the first printing operation so as to insert a second type of sheet supplied from the sheet supply source for a first type of sheet supplied from the sheet supply source, the first printing device to operate so that the first data is stored in the memory unit of the first printing device before the second printing operation by the second printing device is finished and the first printing operation based on the first data of the memory unit can be started after the second printing operation by the second printing device is finished.

25. An operating method according to claim 24, wherein at least a type of data to be printed on the first type of sheet is different from a type of data to be printed on the second type of sheet.

26. An operating method according to claim 23, wherein said method causes, in the case where the inserter function is used in the first printing operation so as to insert the sheet supplied from the predetermined sheet supply source and print-processed in the second printing operation for the sheet supplied from the sheet supply source and print-processed in the first printing operation, the first printing device to operate so that the first data is stored in the memory unit of the first printing device before the second printing operation by the second printing device is finished and the first printing operation based on the first data of the memory unit can be started after the second printing operation by the second printing device is finished.

27. An operating method according to claim 23, wherein said method causes the first printing device to perform the first printing operation and causes the second printing device to perform the second printing operation.

28. An operating method according to claim 27,
wherein said method causes a first image forming apparatus and a second image forming apparatus to perform a distributed printing operation which distributes the printing operation of the data output from one data supply source to the first printing operation by the first printing device and the second printing operation by the second printing device, and
wherein said method causes, in the case where the inserter function is used in the first printing operation so as to insert the sheet supplied from the predetermined sheet supply source and print-processed in the second printing operation as the distributed printing operation for the sheet print-processed in the first printing operation as the distributed printing operation, the first printing device to operate so that the first data is stored in the memory unit of the first printing device before the second printing operation by the second printing device is finished and the first printing operation based on the first data in the memory unit can be started after the second printing operation by the second printing device was started.

29. An operating method according to claim 28, wherein the distributed printing operation includes a printing operation to cause the first printing device to perform the printing operation of a part of a series of data consisting of plural pages output from one data supply source and to cause the second printing device to perform the printing operation of other part of the series of data.

30. An operating method according to claim 28, wherein the distributed printing operation includes a printing operation to cause the first printing device to perform the printing operation of partial page of a series of data consisting of plural pages output from one data supply source and to cause the second printing device to perform the printing operation of other page of the series of data.

31. An operating method according to claim 28, wherein the distributed printing operation includes a printing operation to cause the first printing device to perform the printing operation of the first type of data included in a series of data mixedly composed of the first type of data and the second type of data output from one data supply source and to cause the second printing device to perform the printing operation of the second type of data included in the series of data.

32. An operating method according to claim 31, wherein the first type of data is black and white data and the second type of data is color data.

33. An operating method according to claim 31, wherein the first type of data is photograph data and the second type of data is character data.

34. An operating method according to claim 23, wherein the data supply source includes a computer, and the first and second printing devices can respectively perform the printing operations on the data output by the computer.

35. An operating method according to claim 34, wherein the first and second printing devices can receive the data output by a first computer through a second computer.

36. An operating method according to claim 23, wherein the first printing device has a scanner unit, and the data from the scanner unit can be printed by the first printing device through the memory unit.

37. An operating method according to claim 23, further comprising a step of enabling the data supply source to confirm function information of the first printing device.

38. An operating method according to claim 37, further comprising a step of enabling the data supply source to confirm function information of the second printing device.

39. An operating method according to claim 23, further comprising a step of causing a user interface unit of the data supply source to notify the user of information for enabling the user to discriminate that the second printing operation in the second printing device was finished.

40. An operating method according to claim 23, further comprising a step of causing an operation unit of at least one of the first and second printing devices to notify the user of information for enabling the user to discriminate that the second printing operation in the second printing device was finished.

41. An operating method according to claim 23, further comprising a step of causing a user interface unit of the data supply source to notify the user of message information for enabling the user to confirm an action which should be performed by the user when the first printing operation in the first printing device is performed.

42. An operating method according to claim 23, further comprising a step of causing an operation unit of at least one of the first and second printing devices to notify the user of message information for enabling the user to confirm an action which should be performed by the user when the first printing operation in the first printing device is performed.

43. An operating method according to claim 23, wherein an occupation time of the first printing device for the first printing operation is shortened by operating the first printing device so that the first printing operation can be started after the second printing operation was started.

44. An operating method according to claim 23,
wherein said method includes permitting a start of the first printing operation based on the first data of the memory unit, when a first instruction is input by a user through a user interface unit after the second printing operation is finished, and
wherein said method includes inhibiting the start of the first printing operation based on the first data of the memory unit, when the first instruction is not input through the user interface unit after the second printing operation is finished.

45. An operating method according to claim 44, wherein said method includes canceling the first printing operation based on the first data of the memory unit, when a second instruction is input by the user through the user interface unit after the second printing operation is finished.

46. An operating method according to claim 44, wherein the user interface unit includes an operation unit of at least either one of the first printing device and the second printing device.

47. An operating method according to claim 44, wherein the user interface unit includes an operation unit of a computer acting as the data source.

48. An operating method according to claim 23,
wherein said method includes enabling a display unit to perform a first display for enabling a user to input a first instruction after the second printing operation is finished, wherein said method includes permitting a start of the first printing operation based on the first data of the memory unit, when the first instruction is input by the user through the first display after the second printing operation is finished, and wherein said method includes inhibiting the start of the first printing operation based on the first data of the memory unit, when the first instruction is not input through the first display after the second printing operation is finished.

49. An operating method according to claim 48, wherein said method includes enabling the display unit to perform a second display for enabling the user to input a second instruction after the second printing operation is finished, wherein said method includes canceling the first printing operation based on the first data of the memory unit, when the second instruction is input by the user through the second display after the second printing operation is finished.

50. An operating method according to claim 23, wherein said method includes enabling an operation unit to perform a display for enabling a user to select any one of plural data stored in the memory unit, and wherein when the first data being the print target in the first printing operation is selected through the display, said method includes enabling to start the first printing operation based on the selected first data after the second printing operation is finished.

51. An operating method according to claim 50, wherein the operation unit includes at least one of an operation unit of a computer acting as the data source, an operation unit of the first printing device, and an operation unit of the second printing device.

52. An operating method according to claim 50, wherein said method includes enabling to select through the display another data other than the first data from among the plural data stored in the memory unit, and wherein when the another data is selected through the display, said method includes causing the first printing device to be able to perform another printing operation based on the another data selected in the memory unit, irrespective of the first printing operation.

53. An operating method according to claim 52, wherein when the first data is selected through the display, said method includes enabling the operation unit to perform another display for enabling the user to input an instruction to start the first printing operation, and, on condition that the instruction is input through the another display, said method enables to start the first printing operation, and wherein when the another data is selected through the display, said method includes causing the first printing device to be able to perform the another printing operation without causing the operation unit to perform the another display.

54. An operating method according to claim 23, wherein the predetermined sheet supply source includes at least either one of an inserter tray provided in a sheet processing device capable of being connected to the first printing device, and a manual feed tray provided in the first printing device itself.

55. An operating method according to claim 23, wherein said method includes causing the data source to output the first data and the second data substantially at the same time, and wherein said method includes performing the first printing operation and the second printing operation at mutually different timing.

56. A computer readable medium for storing a program to execute a method of operating a system which includes at least one of a plurality of devices, the plurality of devices including a first printing device comprising a memory unit capable of storing a plurality of printable data and a second printing device, said method comprising the steps of:

causing the first printing device to execute a first printing operation based on first data output from a same data source as a data source which can output second data of an object to be printed in a second printing operation by the second printing device; and causing, in the case where the first printing device has an inserter function for enabling an insert process of sheet from a predetermined sheet supply source for a sheet from a sheet supply source in the first printing operation, the first printing device to operate so that the first data is stored in the memory unit of the first printing device before the second printing operation by the second printing device is finished and the first printing operation, based on the first data of the memory unit, can be started after the second printing operation by the second printing device is finished when the inserter function in the first printing operation is used.

57. A system which includes at least one of a plurality of devices, the plurality of devices including a first printing device comprising a memory unit capable of storing a plurality of printable data and a second printing device, said system comprising:

a print unit adapted to cause the first printing device to execute a first printing operation based on first data output from a same data source as a data source which can output second data of an object to be printed in a second printing operation by the second printing device; and a control unit adapted to cause, in the case where the first printing device has an inserter function for enabling an insert process of sheet from a predetermined sheet supply source for a sheet from a sheet supply source in the first printing operation, the first printing device to operate so that the first data is stored in the memory unit of the first printing device before the second printing operation by the second printing device is finished and the first printing operation, based on the first data of the memory unit, can be started after the second printing operation by the second printing device is finished when the inserter function in the first printing operation is used.

58. An operating method of a system which includes at least one of a plurality of devices, the plurality of devices including a first printing device comprising a first memory unit capable of storing a plurality of printable data and a second printing device comprising a second memory unit capable of storing a plurality of printable data, said method comprising the steps of:

causing the first printing device to execute a first printing operation based on first data output from a data source, and causing the second printing device to execute a second printing operation based on second data output from a same data source as the data source;

causing, in the case where the first printing device has an inserter function for enabling an insert process of sheet from a predetermined sheet supply source for a sheet from a sheet supply source in the first printing operation, the first printing device to operate so that the first data is stored in the first memory unit before the second printing operation is finished and the first printing operation, based on the first data of the first memory unit, can be started after the second printing operation is finished when an inserter function in the first printing operation is used; and causing, in a case where the second printing device has an inserter function for enabling an insert process of sheet from a predetermined sheet supply source for a sheet from a sheet supply source in the second printing operation, the second printing device to operate so that the second data is stored in the second memory unit before the first printing operation is finished and the second printing operation, based on the second data of the second memory unit, can be started after the first printing operation is finished when the inserter function in the second printing operation is used.

59. An operating method according to claim 58, wherein said method includes enabling to perform an output operation of the first data from the data source to the first printing device and an output operation of the second data from the data source to the second printing device substantially at the same time, and wherein said method includes starting the first printing operation and the second printing operation at different timing.

60. An operating method according to claim 58, wherein said method includes causing the first printing device and the second printing device to perform a distributed printing operation which causes the first printing device to print the first data included in a series of data including the first data and the second data as the first printing operation and causes the second printing device to print the second data included in the series of data as the second printing operation.

61. An operating method according to claim 60, wherein the first data corresponds to the data of partial page included in the series of data consisting of plural pages, and the second data corresponds to the data of remaining page included in the series of data.

62. An operating method according to claim 60, wherein the first data corresponds to first type of data included in a series of data mixedly consisting of the first type of data and second type of data, and the second data corresponds to the second type of data included in the series of data.

63. An operating method according to claim 62, wherein the first type of data is black and white data and the second type of data is color data.

64. An operating method according to claim 62, wherein the first type of data is photograph data and the second type of data is character data.

65. An operating method according to claim 58, wherein the data supply source includes a computer, and the first and second printing devices can respectively perform the printing operations of the data output by the computer.

66. An operating method according to claim 58, wherein the first printing device has a scanner unit, and the data from the scanner unit can be printed by the first printing device through the memory unit.

67. An operating method according to claim 58, further comprising the steps of:
enabling the data supply source to confirm function information of the first printing device; and
enabling the data supply source to confirm function information of the second printing device.

68. An operating method according to claim 58, wherein an occupation time of the first printing device for the first printing operation is shortened by controlling start timing of the first printing operation when the insert function is used in the first printing operation by the first printing device, and wherein an occupation time of the second printing device for the second printing operation is shortened by controlling start timing of the second printing operation when the insert function is used in the second printing operation by the second printing device.

69. A computer readable medium for storing a program to execute a method of operating a system which includes at least one of a plurality of devices, the plurality of devices including a first printing device comprising a first memory unit capable of storing a plurality of printable data and including a second printing device comprising a second memory unit capable of storing a plurality of printable data, said method comprising the steps of:
causing the first printing device to execute a first printing operation based on first data output from a data source, and causing the second printing device to execute a second printing operation based on second data output from a same data source as the data source;
causing, in a case where the first printing device has an inserter function for enabling an insert process of sheet from a predetermined sheet supply source for a sheet from a sheet supply source in the first printing operation, the first printing device to operate so that the first data is stored in the first memory unit before the second printing operation is finished and the first printing operation based on the first data of the first memory unit can be started after the second printing operation is finished when the inserter function in the first printing operation is used; and
causing, in the case where the second printing device has an inserter function for enabling an insert process of sheet from a predetermined sheet supply source for a sheet from a sheet supply source in the second printing operation, the second printing device to operate so that the second data is stored in the second memory unit before the first printing operation is finished and the second printing operation based on the second data of the second memory unit can be started after the first printing operation is finished when the inserter function in the second printing operation is used.

70. A system which includes at least one of a plurality of devices, the plurality of devices including a first printing device comprising a first memory unit capable of storing a plurality of printable data and a second printing device comprising a second memory unit capable of storing a plurality of printable data, said system comprising:
a unit adapted to cause the first printing device to execute a first printing operation based on first data output from a data source, and cause the second printing device to execute a second printing operation based on second data output from a same data source as the data source;
a unit adapted to cause, in the case where the first printing device has an inserter function for enabling an insert process of sheet from a predetermined sheet supply source for a sheet from a sheet supply source in the first printing operation, the first printing device to operate so that the first data is stored in the first memory unit before the second printing operation is finished and the first printing operation based on the first data of the first memory unit can be started after the second printing operation is finished when the inserter function in the first printing operation is used; and
a unit adapted to cause, in the case where the second printing device has an inserter function for enabling an insert process of sheet from a predetermined sheet supply source for a sheet from a sheet supply source in the second printing operation, the second printing device to operate so that the second data is stored in the second memory unit before the first printing operation is finished and the second printing operation based on the second data of the second memory unit can be started after the first printing operation is finished when the inserter function in the second printing operation is used.

* * * * *

UNITED STATES PATENT AND TRADEMARK OFFICE
CERTIFICATE OF CORRECTION

PATENT NO. : 7,359,079 B2 Page 1 of 1
APPLICATION NO. : 11/200029
DATED : April 15, 2008
INVENTOR(S) : Miyahara It is certified that error appears in the above-identified patent and that said Letters Patent is hereby corrected as shown below:

COVER SHEET:
Title Page; item (57); Abstract, Line 17, "differ" should read -- to differ --.

COLUMN 1:
Line 25, "data" (1st occurrence) should read -- data, --.

COLUMN 3:
Line 31, "the" (1st occurrence) should be deleted; and
Line 33, "the" (1st occurrence) should be deleted.

Signed and Sealed this

Twenty-eighth Day of October, 2008

JON W. DUDAS
*Director of the United States Patent and Trademark Office*